(12) United States Patent
Ishige

(10) Patent No.: US 11,094,278 B2
(45) Date of Patent: Aug. 17, 2021

(54) DISPLAY APPARATUS INCLUDING A SUBSTRATE WITH FIRST AND SECOND REGIONS INCLUDING RESPECTIVE FIRST AND SECOND CIRCUIT PORTIONS WITH DIFFERENT DIMENSIONS

(71) Applicant: Japan Display Inc., Minato-ku (JP)

(72) Inventor: Nobuyuki Ishige, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/156,413

(22) Filed: Oct. 10, 2018

(65) Prior Publication Data

US 2019/0043439 A1 Feb. 7, 2019

Related U.S. Application Data

(63) Continuation of application No. 15/017,926, filed on Feb. 8, 2016, now abandoned.

(30) Foreign Application Priority Data

Feb. 12, 2015 (JP) .................................. 2015-025018

(51) Int. Cl.
*G09G 3/36* (2006.01)
*G02F 1/1345* (2006.01)

(52) U.S. Cl.
CPC ......... *G09G 3/3677* (2013.01); *G02F 1/1345* (2013.01); *G02F 2201/56* (2013.01);
(Continued)

(58) Field of Classification Search
CPC ... G09G 2310/0202; G09G 2310/0286; G09G 3/3677
See application file for complete search history.

(56) References Cited

U.S. PATENT DOCUMENTS 6,590,553 B1 * 7/2003 Kimura ................ G09G 3/3651
345/204
8,139,194 B2 * 3/2012 Yamamoto .......... G02F 1/13454
345/55
(Continued)

FOREIGN PATENT DOCUMENTS

JP   2008-292995 A   12/2008
JP   2009-122636 A   6/2009
(Continued)

OTHER PUBLICATIONS

Japanese Office Action dated Dec. 11, 2018 in Patent Application No. 2015-025018 (with unedited computer generated English translation), citing documents AO-AQ therein, 7 pages.
(Continued)

*Primary Examiner* — Ram A Mistry
(74) *Attorney, Agent, or Firm* — Oblon, McClelland, Maier & Neustadt, L.L.P.

(57) ABSTRACT

An area of a region arranged on one side of a display region in a direction in which scanning lines extend is reduced. A display apparatus has a scanning line driving circuit and a plurality of scanning lines. The scanning line driving circuit is provided in a region arranged along a side portion on the positive side in the X-axis direction in a display region of a substrate. The scanning line driving circuit includes a plurality of transfer circuits connected to the plurality of scanning lines, respectively. Among the plurality of transfer circuits, the shape of one transfer circuit is different from the shape of another transfer circuit arranged on the negative side of the one transfer circuit in the Y-axis direction.

8 Claims, 18 Drawing Sheets

(52) U.S. Cl.
CPC ............... *G09G 2300/0408* (2013.01); *G09G 2310/0202* (2013.01); *G09G 2310/0286* (2013.01)

(56) References Cited

U.S. PATENT DOCUMENTS

| | | | |
|---|---|---|---|
| 2009/0189835 A1* | 7/2009 | Kim | ................... G09G 3/3677 345/80 |
| 2009/0195481 A1 | 8/2009 | Taguchi et al. | |
| 2010/0013823 A1 | 1/2010 | Kwon | |
| 2014/0267156 A1 | 9/2014 | Koga et al. | |

FOREIGN PATENT DOCUMENTS

| | | |
|---|---|---|
| JP | 2009-180961 | 8/2009 |
| JP | 2014-182203 | 9/2014 |
| KR | 10-2011-0065823 A | 6/2011 |

OTHER PUBLICATIONS

Office Action dated Jun. 16, 2020, in Japanese Patent Application No. 2019-097001. w/English Machine Translation.

* cited by examiner

DISPLAY APPARATUS INCLUDING A SUBSTRATE WITH FIRST AND SECOND REGIONS INCLUDING RESPECTIVE FIRST AND SECOND CIRCUIT PORTIONS WITH DIFFERENT DIMENSIONS

CROSS-REFERENCE TO RELATED APPLICATION

This application is a Continuation of U.S. application Ser. No. 15/017,926 filed Feb. 8, 2016, which claims priority from Japanese Patent Application No. 2015-25018 filed on Feb. 12, 2015, the content of which is hereby incorporated by reference into this application.

TECHNICAL FIELD OF THE INVENTION

The present invention relates to a display apparatus. For example, the present invention relates to a technique effectively applied to a display apparatus that has a scanning line for supplying a scanning signal to a plurality of pixels provided in a display region.

BACKGROUND OF THE INVENTION

There is a display apparatus that displays an image by supplying a scanning signal and a video signal to a plurality of pixels provided in a display region via a plurality of scanning lines and a plurality of video lines, respectively. In such a display apparatus, it is required to reduce a size of a peripheral region of the display region in order to downsize the display region and to increase a size of the display region.

For example, Japanese Patent Application Laid-Open Publication No. 2014-182203 (Patent Document 1) describes a technique for a display apparatus that has a display unit having a plurality of scanning signal lines to which a scanning signal is applied and a gate driver including a shift register having a plurality of stages of transfer circuits.

A display region of such a display apparatus generally has a rectangular shape. However, some display apparatuses have a display region having a shape other than the rectangular shape in accordance with the diversity of design for in-vehicle, watch, and accessory applications and others. Such a display apparatus that has a display region having a shape other than a rectangular shape is also referred to as variant display.

For example, Japanese Patent Application Laid-Open Publication No. 2009-180961 (Patent Document 2) describes a technique for a display apparatus that has a display area in which a non-rectangular-shaped display range is defined.

SUMMARY OF THE INVENTION

The display apparatus serving as the above-described variant display also has a gate driver formed of, for example, a shift register, i.e., a scanning line driving circuit as similar to the display apparatus that has the rectangular-shaped display region. Also in the display apparatus serving as the variant display as similar to the display apparatus that has the rectangular-shaped display region, a shift register serving as a scanning line driving circuit is arranged on one side or both sides of a display region in a direction in which scanning lines extend.

However, in the display apparatus serving as the variant display, a connection wiring that connects any video line of a plurality of video lines and a video line driving circuit is provided in a peripheral region of the display region, the peripheral region being arranged on one side or both sides of the display region in a direction in which scanning lines extend. Accordingly, in addition to a shift register, the connection wiring that connects the video line and the video line driving circuit is also arranged in a portion closer to the video line driving circuit in the region on one side or both sides of the display region in the direction in which the scanning lines extend. Consequently, a portion where the shift register and the connection wiring are arranged and a portion where only the shift register is arranged exist, which result in a portion whose area in the peripheral region outside the display region cannot be reduced.

The present invention has been made in order to solve the conventional problems as described above, and an object of the present invention is to provide a display apparatus in which the area of a peripheral region of a display region in a direction in which scanning lines extend can be reduced.

The typical summary of the inventions disclosed in the present application will be briefly described as follows.

A display apparatus according to an aspect of the present invention has a substrate, a plurality of pixels provided on the substrate, a first circuit that outputs a scanning signal to be supplied to the plurality of pixels, and a plurality of scanning lines that connect the plurality of pixels and the first circuit. The substrate includes a first region of the substrate and a second region that is a region arranged along a first side portion on a first side of the first region of the substrate in a first direction. The plurality of pixels are provided in the first region, and the first circuit is provided in the second region. Each of the plurality of scanning line is provided in the first region and extends in the first direction in a plan view. The first circuit includes a plurality of circuit portions that are connected to first ends of the plurality of scanning lines on the first side in the first direction, respectively. A first circuit portion of the plurality of circuit portions is electrically connected to a first scanning line of the plurality of scanning lines, and a second circuit portion of the plurality of circuit portions is electrically connected to a second scanning line arranged on a second side of the first scanning line of the plurality of scanning lines in a second direction different from the first direction. The shape of the first circuit portion is different from the shape of the second circuit portion.

In another aspect, the length of the first circuit portion in the first direction may be different from the length of the second circuit portion in the first direction. Furthermore, the length of the first circuit portion in the second direction may be different from the length of the second circuit portion in the second direction. Furthermore, a ratio of the length of the first circuit portion in the second direction with respect to the length of the first circuit portion in the first direction may be different from a ratio of the length of the second circuit portion in the second direction with respect to the length of the second circuit portion in the first direction. Furthermore, the length of the first scanning line may be different from the length of the second scanning line.

In another aspect, the display apparatus may include a second circuit to which a video signal to be supplied to the plurality of pixels is input, and a plurality of video lines that connect the plurality of pixels and the second circuit. The substrate may include a third region that is a region of the substrate and that is arranged on a second side of the first region in the second direction, and the second circuit may be provided in the third region. The plurality of video lines may be provided in the first region and may extend in the second direction and be aligned in the first direction in a plan view. The first side portion of the first region may have such a shape as being located closer to the first side in the first direction as being closer to a side opposite to the second side in the second direction.

At this time, the length of the first scanning line may be longer than the length of the second scanning line. Furthermore, a ratio of the length of the first circuit portion in the second direction with respect to the length of the first circuit portion in the first direction may be smaller than a ratio of the length of the second circuit portion in the second direction with respect to the length of the second circuit portion in the first direction.

Furthermore, at this time, the display apparatus may have a plurality of video signal connection wirings connected to second ends of the plurality of video lines on the second side in the second direction, respectively. Furthermore, the second circuit may be connected to the second end of each of the plurality of video lines via each of the plurality of video signal connection wirings. Also, a first video line of the plurality of video lines may overlap the first side portion in a plan view, a first video signal connection wiring of the plurality of video signal connection wirings may be connected to the first video line, and the first video signal connection wiring may be provided in the second region.

Furthermore, at this time, the substrate may include a fourth region that is a region of the substrate and that is arranged on a side of the first region opposite to the second side in the second direction. Furthermore, among the plurality of circuit portions, a third circuit portion connected to a third scanning line arranged at a third end on a side opposite to the second side of the plurality of scanning lines in the second direction may be provided in the fourth region.

In another aspect, the first circuit may include a plurality of scanning signal connection wirings connected to the first ends of the plurality of scanning lines, respectively. Furthermore, the plurality of circuit portions may be connected to the first ends of the plurality of scanning lines via the plurality of scanning signal connection wirings, respectively, a first scanning signal connection wiring of the plurality of scanning signal connection wirings may be connected to the first scanning line, and a second scanning signal connection wiring of the plurality of scanning signal connection wirings may be connected to the second scanning line. At this time, the first scanning signal connection wiring may include a first extension extending in a third direction, and the second scanning signal connection wiring may include a second extension extending in a fourth direction different from the third direction.

Alternatively, a display apparatus according to an aspect of the present invention includes a substrate, a plurality of pixels provided on the substrate, a first circuit that outputs a scanning signal to be supplied to the plurality of pixels, and a plurality of scanning lines that connect the plurality of pixels and the first circuit. The substrate has a first region of the substrate and a second region that is a region arranged along a first side portion of the first region on a first side in a first direction. The plurality of pixels are provided in the first region, and the first circuit is provided in the second region. The plurality of scanning lines are provided in the first region and extend in the first direction in a plan view. The first circuit includes a plurality of scanning signal connection wirings connected to first ends of the plurality of scanning lines on the first side in the first direction, respectively, and a plurality of circuit portions connected to the first ends of the plurality of scanning lines via the plurality of scanning signal connection wirings, respectively. A first scanning signal connection wiring of the plurality of scanning signal connection wirings is connected to a first scanning line of the plurality of scanning lines, and a second scanning signal connection wiring of the plurality of scanning signal connection wirings is connected to a second scanning line of the plurality of scanning lines arranged on a second side of the first scanning line in a second direction different from the first direction. The first scanning signal connection wiring includes a first extension extending in the third direction, and the second scanning signal connection wiring includes a second extension extending in a fourth direction different from the third direction.

In another aspect, the display apparatus may have a second circuit to which a video signal to be supplied to the plurality of pixels is input, and a plurality of video lines that connect the plurality of pixels and the second circuit. The substrate may include a third region that is a region of the substrate and that is arranged on the second side of the first region in the second direction, and the second circuit may be provided in the third region. The plurality of video lines may be provided in the first region and may extend in the second direction and be aligned in the first direction in a plan view, and the first side portion of the first region may have such a shape as being located closer to the first side in the first direction as being closer to a side opposite to the second side in the second direction.

In another aspect, an angle formed between the third direction and the first direction may be larger than that formed between the fourth direction and the first direction.

In another aspect, the display apparatus may have a plurality of video signal connection wirings connected to second ends of the plurality of video lines on the second side in the second direction, respectively. Furthermore, the second circuit may be connected to the second end of each of the plurality of video lines via each of the plurality of video signal connection wirings. A first video line of the plurality of video lines may overlap the first side portion in a plan view, a first video signal connection wiring of the plurality of video signal connection wirings may be connected to the first video line, and the first video signal connection wiring may be provided in the second region.

Alternatively, a display apparatus according to an aspect of the present invention has a substrate having a display region and a peripheral region that is provided outside the display region, a plurality of scanning lines and a plurality of video lines that are provided in the display region, a shift register that is provided in the peripheral region and supplies scanning signals to the plurality of scanning lines, and a plurality of scanning line connection wirings that connect the plurality of scanning lines and the shift register. A plurality of video line connection wirings connected to the plurality of video lines and the scanning line connection wirings intersect in the peripheral region. A first circuit portion of the shift register is connected to a first scanning line connection wiring of the plurality of scanning line connection wirings, and a second circuit portion of the shift register is connected to a second scanning line connection wiring different from the first scanning line connection wiring of the plurality of scanning line connection wirings. The shape of the first circuit portion is different from that of the second circuit portion.

In another aspect, the length of a first scanning line of the plurality of scanning lines may be different from that of a second scanning line of the plurality of scanning lines. Furthermore, the display region may have a non-rectangular shape.

In another aspect, a signal line that supplies a clock to the shift register may be provided in the peripheral region, the first circuit portion and the second circuit portion may be connected to the signal line, and the first circuit portion and the second circuit portion may be provided between the signal line and the display region.

In another aspect, a ratio of the length of the first circuit portion in the second direction with respect to the length of the first circuit portion in the first direction may be different from a ratio of the length of the second circuit portion in the second direction with respect to the length of the second circuit portion in the first direction.

In another aspect, an angle formed between a direction in which the plurality of scanning lines extend and the first scanning line connection wiring may be different from an angle formed between the direction in which the plurality of scanning lines extend and the second scanning line connection wiring.

BRIEF DESCRIPTIONS OF THE DRAWINGS

DESCRIPTIONS OF THE PREFERRED EMBODIMENTS

Figure 1:
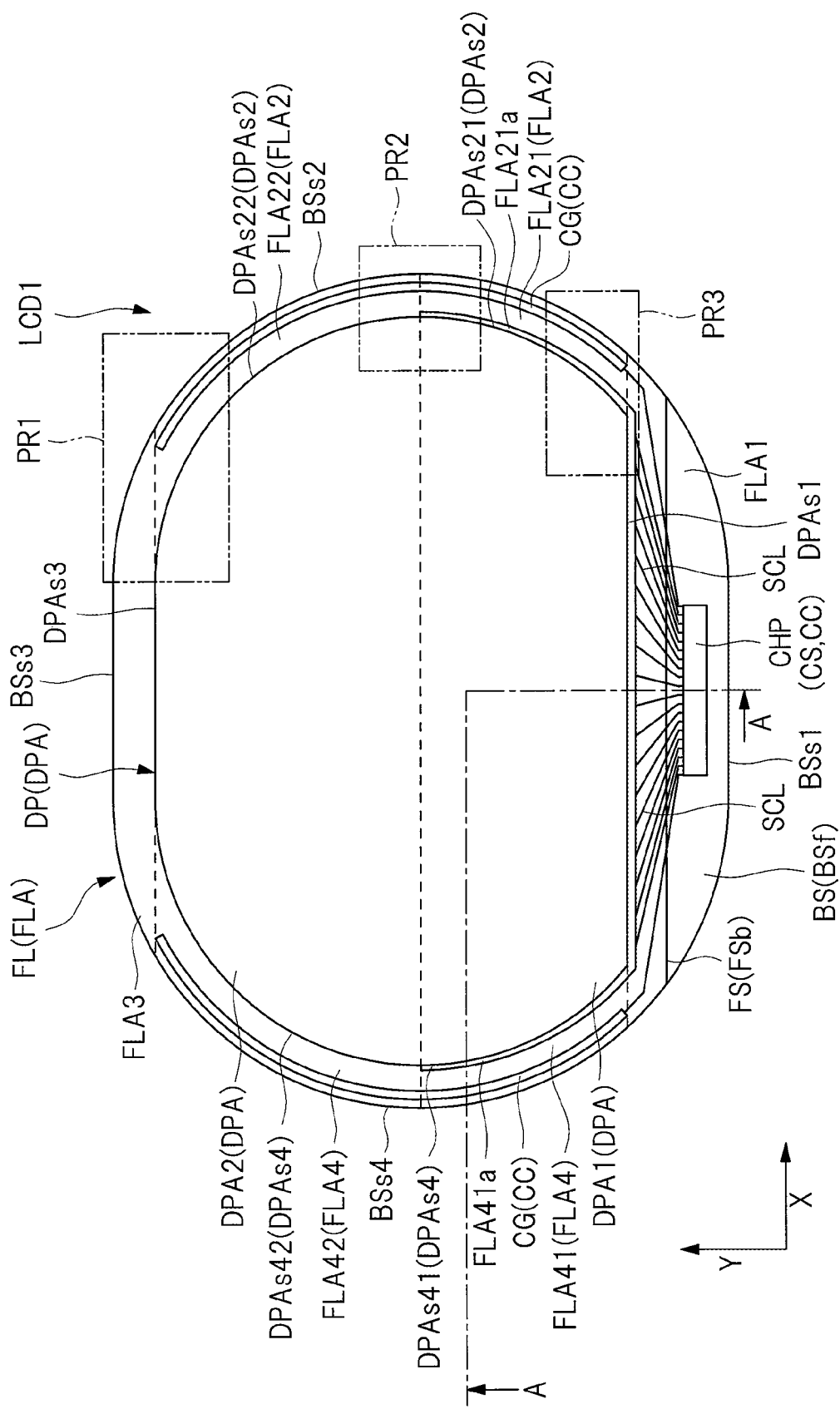
FIG. 1 is a plan view illustrating an example of a display apparatus according to a first embodiment.

Hereinafter, each embodiment of the present invention will be explained with reference to drawings.

Note that disclosure is merely one example, and appropriate change with keeping the concept of the invention which can be easily thought up by those who skilled in the art is obviously contained in the scope of the present invention. Also, in order to make the clear description, the drawings are illustrated more schematically for a width, a thickness, a shape, and others of each portion than those in an actual aspect in some cases. However, they are merely examples, and do not restrict the interpretation of the present invention.

In the present specification and each drawing, similar elements to those described earlier for the already-described drawings are denoted by the same reference characters, and detailed description for them is appropriately omitted in some cases.

Further, in some drawings used in the embodiments, hatching is omitted even in a cross-sectional view so as to make the drawings easy to see. Also, hatching is used even in a plan view so as to make the drawings easy to see.

The technique described in the embodiments below is widely applicable to display apparatuses that have a mechanism for supplying signals from the periphery of a display region to a plurality of elements provided in the display region in which a display function layer is provided. As the display apparatus as described above, for example, various display apparatuses such as a liquid crystal display apparatus and an organic EL (Electro-Luminescence) display apparatus can be exemplified. In the embodiments described below, the liquid crystal display apparatus is exemplified and described as a representative example of the display apparatus.

The liquid crystal display apparatuses are roughly classified into the following two types depending on a direction of application of an electric field for changing an orientation of liquid crystal molecules in a liquid crystal layer which is the display function layer. That is, as the first classification, a so-called vertical electric field mode in which an electric field is applied in a thickness direction (or an out-of-plane direction) of the display apparatus is cited. The vertical electric field mode includes, for example, a TN (Twisted Nematic) mode, a VA (Vertical Alignment) mode, and others.

Also, as the second classification, a so-called horizontal electric field mode in which an electric field is applied in a planar direction (or an in-plane direction) of the display apparatus is cited. The horizontal electric field mode includes, for example, an IPS (In-Plane Switching) mode, an FFS (Fringe Field Switching) mode which is one type of the IPS mode, and others. The technique described below is applicable to both the vertical electric field mode and the horizontal electric field mode. However, in the embodiments described below, a display apparatus of the horizontal electric field mode is described as an example.

First Embodiment

<Configuration of Display Apparatus>

Figure 2:
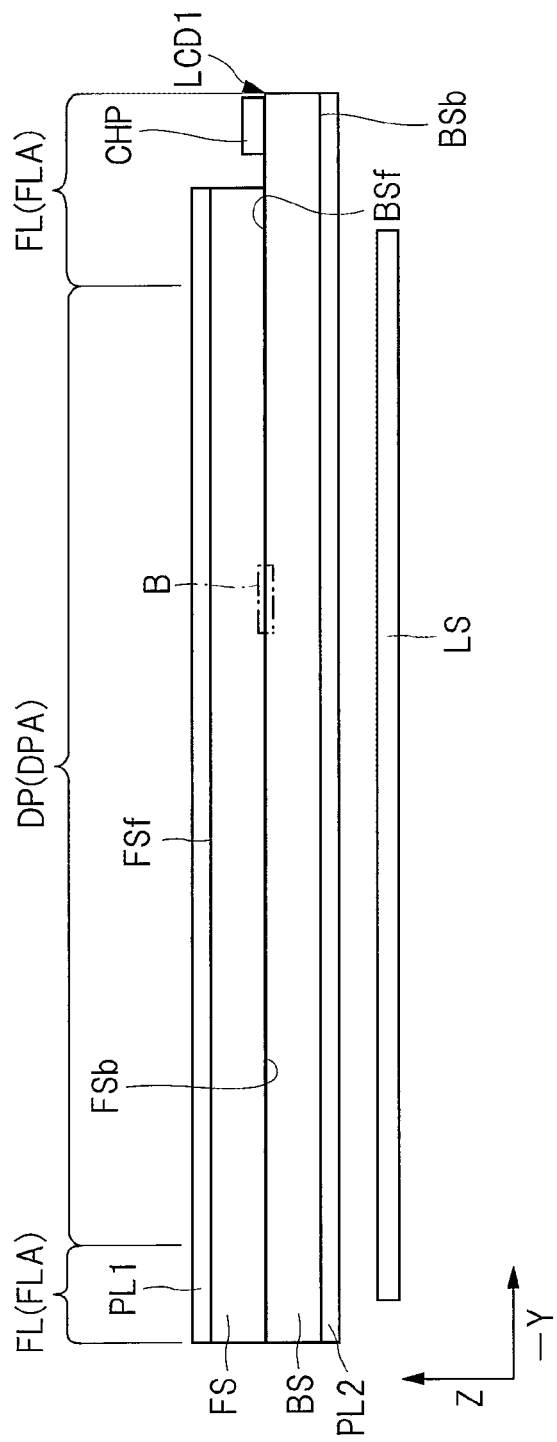
FIG. 2 is a cross-sectional view illustrating an example of the display apparatus according to the first embodiment.
Figure 3:
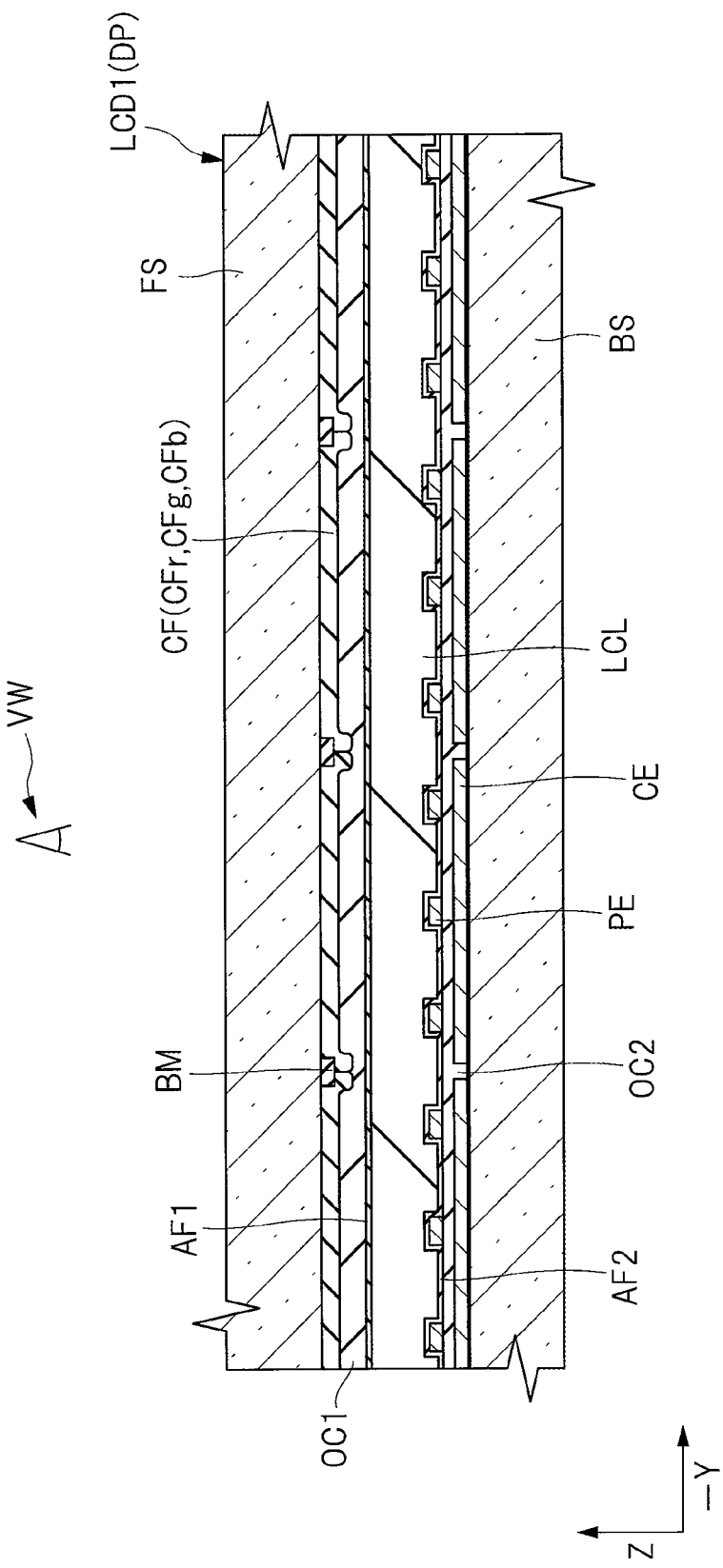
FIG. 3 is a cross-sectional view illustrating an example of the display apparatus according to the first embodiment.

First, a configuration of a display apparatus is described with reference to FIGS. 1 to 3. FIG. 1 is a plan view illustrating an example of a display apparatus according to a first embodiment. FIGS. 2 and 3 are cross-sectional views illustrating the example of the display apparatus according to the first embodiment. FIG. 2 is a cross-sectional view taken along a line A-A in FIG. 1. FIG. 3 is an enlarged cross-sectional view of a B portion in FIG. 2.

For simplification of illustration, note that illustration of scanning lines GL (see FIG. 4 that will be described later) and video lines SL (see FIG. 4 that will be described later) is omitted in a display region DPA in FIG. 1. And, although FIG. 2 illustrates the cross-sectional view, hatching is omitted for simplification of illustration.

As illustrated in FIG. 1, a display apparatus LCD1 according to the first embodiment has a display portion DP which displays an image. A region of a substrate BS, where the display portion DP is provided, is the display region DPA. Furthermore, the display apparatus LCD1 has a frame portion (peripheral portion) FL that is a portion in periphery of the display portion DP in a plan view and does not display an image. A region where the frame portion FL is provided is a frame region FLA. That is, the frame region FLA is a region in periphery of the display region DPA (that is a peripheral region).

In the specification of the present application, note that the term "in a plan view" means a case of viewing from a direction perpendicular to a main surface of the substrate BS as illustrated in FIG. 1.

Furthermore, the display apparatus LCD1 has a structure in which a liquid crystal layer which is a display function layer is formed between a pair of substrates that face each other. That is, as illustrated in FIG. 2, the display apparatus LCD1 has a substrate FS on a display surface side, a substrate BS located on the side opposite to the substrate FS, and a liquid crystal layer LCL (see FIG. 3) arranged between the substrate FS and the substrate BS.

Note that the display apparatus LCD1 according to the first embodiment is a so-called variant display in which the planar shapes of the substrates BS and FS and the display portion DP are different from a rectangular shape. That is, the display region has a non-rectangular shape. The planar shapes of the substrates BS and FS and the display portion DP will be described later.

Also, when the references of the X-axis and the Y axis are located at the center of the display portion DP in a plan view, the substrate BS illustrated in FIG. 1 has a side portion BSs1 on the negative side in the Y-axis direction, a side portion BSs2 on the positive side in the X-axis direction, a side portion BSs3 on the positive side in the Y-axis direction, and a side portion BSs4 on the negative side in the X-axis direction. Distances from the side portion BSs2, the side portion BSs3, and the side portion BSs4 included in the substrate BS illustrated in FIG. 1 to the display portion DP are almost the same as each other, and are shorter than a distance from the side portion BSs1 to the display portion DP.

Hereinafter, the term "peripheral portion (end portion) of the substrate BS" in the specification of the present application means any of the side portion BSs1, the side portion BSs2, the side portion BSs3, and the side portion BSs4 configuring an outer periphery of the substrate BS. Also, the simple term "peripheral portion" means the peripheral portion of the substrate BS.

The display portion DP has pixels Pix (see FIG. 4 that will be described later) as a plurality of display elements. That is, the plurality of pixels Pix are provided in the display region DPA. The plurality of pixels Pix are aligned in a matrix in the X-axis direction and the Y-axis direction. In the present first embodiment, each of the plurality of pixels Pix has a thin-film transistor (TFT) formed in the display region DPA on a front surface BSf side which is a main surface of the substrate BS.

The display apparatus LCD1 has a plurality of scanning lines GL and a plurality of video lines SL as described with reference to FIG. 4 that will be described later. As described with reference to FIG. 4 that will be described later, each of the plurality of scanning lines GL is electrically connected to the plurality of pixels Pix aligned in the X-axis direction, and each of the plurality of video lines SL is electrically connected to the plurality of pixels Pix aligned in the Y-axis direction.

The display apparatus LCD1 has a driving circuit CC. The driving circuit CC includes a control circuit of a scanning line driving circuit CG, and a video line driving circuit CS. The scanning line driving circuit CG is electrically connected to the plurality of pixels Pix (see FIG. 4 that will be described later) via the plurality of scanning lines GL (see FIG. 4 that will be described later), and the video line driving circuit CS is electrically connected to the plurality of pixels Pix (see FIG. 4 that will be described later) via the plurality of video lines SL (see FIG. 4 that will be described later).

In the example illustrated in FIG. 1, the driving circuit CC is provided in a frame region FLA1 which is a portion between the side portion BSs1 of the substrate BS and the display portion DP, and the driving circuit CC is configured by a semiconductor chip CHP.

Note that the semiconductor chip CHP may be provided in the frame region FLA1 by using a so-called COG (Chip On Glass) technique or may be provided outside the substrate BS and connected to the substrate BS via FPC (Flexible Printed Circuits).

The display apparatus LCD1 has a seal portion formed in the frame region FLA in a plan view. The seal portion is formed so as to continuously surround the display portion DP, and the substrate FS and the substrate BS illustrated in FIG. 2 are bonded and fixed to each other by using a seal material provided in the seal portion. By the provision of the seal portion in periphery of the display portion DP as described above, the liquid crystal layer LCL (see FIG. 3) which is a display function layer can be sealed.

As illustrated in FIG. 2, a back surface BSb side of the substrate BS of the display apparatus LCD1 is provided with a backlight LS made up of an optical element such as a light source and a diffusion plate, and a polarization plate PL2 that polarizes light from the backlight LS. The polarization plate PL2 is fixed on the substrate BS. On the other hand, a front surface FSf side of the substrate FS is provided with a polarization plate PL1. The polarization plate PL1 is fixed on the substrate FS.

Although FIG. 2 exemplifies basic components of the display apparatus LCD1, other parts in addition to the components illustrated in FIG. 2 can be added as a modification example. For example, a protective film or a cover member may be attached onto a front surface side of the polarization plate PL1 as a protective layer for protecting the polarization plate PL1 from scratches and being dirty. Alternatively, for example, such an aspect that an optical element such as a retardation film is adhered onto the polarization plates PL1 and PL2 is applicable. Alternatively, such a method that an optical element is deposited on each of the substrate FS and the substrate BS is applicable.

Furthermore, as illustrated in FIG. 3, the display apparatus LCD1 has a plurality of pixel electrodes PE and a common electrode CE that are arranged between the substrate FS and the substrate BS. Since the display apparatus LCD1 according the present first embodiment is a display apparatus of the horizontal electric field mode as described above, each of the plurality of pixel electrodes PE and the common electrode CE is provided on the substrate BS.

The substrate BS is made of a glass substrate or others, and a circuit for image display is mainly formed on the substrate BS. The substrate BS has the front surface BSf located on the substrate FS side and the back surface BSb located on the opposite side (see FIG. 2). Driving elements such as TFTs and the plurality of pixel electrodes PE are formed in a matrix on the front surface BSf side of the substrate BS.

In the example illustrated in FIG. 3, the display apparatus LCD1 of the horizontal electric field mode (more specifically, FFS mode) is illustrated, and therefore, the common electrode CE is formed on the front surface side of the substrate BS and is covered with an insulating layer OC2. The plurality of pixel electrodes PE are formed on the substrate FS side of the insulating layer OC2 so as to face the common electrode CE via the insulating layer OC2.

The substrate FS illustrated in FIG. 3 is made of a glass substrate or others, and a color filter CF for forming a color-displayed image is formed on the substrate FS. The substrate FS has a front surface FSf (see FIG. 2) on the display surface side and a back surface FSb located on the side opposite to the front surface FSf. The substrate BS may be referred to as a TFT substrate, and the substrate FS on which the color filter CF is formed may be referred to as a color filter substrate or an opposite substrate because the substrate FS faces the TFT substrate via the liquid crystal layer. As a modification of FIG. 3, note that a configuration in which the color filter CF is provided on the TFT substrate is also applicable.

In the color filter CF on the opposite substrate FS, color filter pixels CFr, CFg, and CFb of three colors such as R (red), G (green), and B (blue) are periodically aligned. In a color display apparatus, respective pixels for displaying R (red), G (green), and B (blue) are set to, for example, sub-pixels, and one pixel is configured so that the sub-pixels of the three colors are configured as one set. The plurality of color filter pixels CFr, CFg, and CFb provided on the substrate FS are located at such positions that they face the respective sub-pixels having the pixel electrodes PE provided on the substrate BS.

A light shielding film BM is formed at boundaries among the color filter pixels CFr, CFg, and CFb of the respective colors. The light shielding film BM is referred to as a black matrix and is made of, for example, a black resin or a low-reflective metal. The light shielding film BM is formed in a grid shape in a plan view. In other words, the substrate FS has the color filter pixels CFr, CFg, and CFb of the respective colors that are formed in openings of the grid-shaped light shielding film BM. Note that the elements configuring one pixel are not limited to the sub-pixels of the three colors such as R (red), G (green), and B (blue), but may additionally include a sub-pixel of a white color (W (white)) or others having a transparent filter. The black matrix is not limited to the grid-shaped formation, but may be shaped in a stripe.

The light shielding film BM provided on the substrate FS is also formed in the frame region FLA. Although the light shielding film BM is also formed inside the display region DPA, the light shielding film BM has a plurality of openings formed in the display region DPA. In general, ends of openings formed on the peripheral portion side of the openings which are formed in the light shielding film BM and in which the color filter CF is embedded are defined as a boundary between the display region DPA and the frame region FLA. Note that a dummy color filter may be provided closer to the peripheral portion side than the display region DPA.

The substrate FS has a resin layer OC1 that covers the color filter CF. Since the light shielding film BM is formed at boundaries among the color filter pixels CFr, CFg, and CFb of the respective colors, a surface of the color filter CF on the liquid crystal layer side is uneven. The rein layer OC1 functions as a planarizing film that planarizes the unevenness of the color filter CF on the liquid crystal layer side. Alternatively, the resin layer OC1 functions as a protective film that prevents diffusion of impurities from the color filter CF into the liquid crystal layer. In the resin layer OC1, a component that is cured by application of energy thereto such as a thermosetting resin component or a photosetting resin component is contained as a material, so that the resin material can be cured.

The liquid crystal layer LCL that forms a displayed image by an electric field formed by application of a display voltage between the pixel electrodes PE and the common electrode CE is provided between the substrate FS and the substrate BS. The liquid crystal layer LCL modulates light that passes the liquid crystal layer LCL in accordance with the state of the applied electric field.

On the back surface FSb which is an interface in contact with the liquid crystal layer LCL, the substrate FS has an orientation film AF1 that covers the resin layer OC1. On the front surface BSf which is an interface in contact with the liquid crystal layer LCL, the substrate BS has an orientation film AF2 that covers the insulating layer OC2 and the plurality of pixel electrodes PE. These orientation films AF1 and AF2 are resin films that are formed so as to uniform initial orientation of liquid crystals contained in the liquid crystal layer LCL and are made of, for example, a polyimide resin.

A method for displaying a color image by using the display apparatus LCD1 illustrated in FIG. 3 is, for example, as follows. Specifically, light emitted from the backlight LS (see FIG. 2) is filtered by the polarization plate PL2 (see FIG. 2), and the light that has passed through the polarization plate PL2 enters the liquid crystal layer LCL. The light that has entered the liquid crystal layer LCL propagates in the thickness direction of the liquid crystal layer LCL (in other words, a direction from the substrate BS toward the substrate FS) while the polarization state of the light is changed in accordance with refractive index anisotropy (in other words, birefringence) of the liquid crystals, and is then emitted from the substrate FS. At this time, the orientation of the liquid crystals is controlled by an electric field formed by application of a voltage to the pixel electrodes PE and the common electrode CE, and thus the liquid crystal layer LCL functions as an optical shutter. That is, in the liquid crystal layer LCL, transmittance of light can be controlled for each sub-pixel. The light that has reached the substrate FS is subjected to a color filtering process (i.e., process for absorbing light having a wavelength other than a predetermined wavelength) in the color filter CF formed on the substrate FS, and is then emitted from the front surface FSf. The light emitted from the front surface FSf is further filtered by the polarization plate PL1 and then reaches a viewer VW.

Note that a thickness of the liquid crystal layer LCL is extremely smaller than thicknesses of the substrate FS and the substrate BS. In the example illustrated in FIG. 3, the thickness of the liquid crystal layer LCL is, for example, about 3 μm to 4 μm.

<Planar Shape of Display Apparatus>

Here, the planar shape of the display apparatus is described with reference to FIG. 1. As described above, the display apparatus LCD1 according to the present first embodiment is a so-called variant display in which the planar shapes of the substrate BS, the substrate FS, and the display portion DP are different from a rectangular shape.

In the example illustrated in FIG. 1, the frame region FLA includes frame regions FLA1, FLA2, FLA3, and FLA4.

The frame region FLA1 is a region arranged on the negative side (the lower side in FIG. 1) of the display region DPA in the Y-axis direction and is a region arranged along a side portion DPAs1 on the negative side of the display region DPA in the Y-axis direction. The frame region FLA2 is a region arranged on the positive side (the right side in FIG. 1) of the display region DPA in the X-axis direction and is a region arranged along a side portion DPAs2 on the positive side of the display region DPA in the X-axis direction. The scanning line driving circuit CG is provided in the frame region FLA2.

The frame region FLA3 is a region arranged on the positive side of the display region DPA in the Y-axis direction (the upper side in FIG. 1) and is a region arranged along a side portion DPAs3 on the positive side of the display region DPA in the Y-axis direction. The frame region FLA4 is a region arranged on the negative side of the display region DPA in the X-axis direction (the left side in FIG. 1) and is a region arranged along a side portion DPAs4 on the negative side of the display region DPA in the X-axis direction.

In the present first embodiment, note that the frame region FLA1 means a portion of the frame region FLA that is located closer to the negative side in the Y-axis direction than the display region DPA of a portion thereof closest to the negative side in the Y-axis direction (the same goes for a second embodiment that will be described later). In the present first embodiment, the frame region FLA3 means a portion of the frame region FLA that is located closer to the positive side in the Y-axis direction than the display region DPA of a portion closest to the positive side in the Y-axis direction (the same goes for the second embodiment that will be described later).

In the example illustrated in FIG. 1, a side portion DPAs21 which is a portion of the side portion DPAs2 of the display region DPA on the negative side in the Y-axis direction (the lower side in FIG. 1) has such a shape as being located closer to the positive side in the X-axis direction (the right side in FIG. 1) as being closer to the positive side in the Y-axis direction (the upper side in FIG. 1). That is, the side portion DPAs2 is convex toward the positive side in the X-axis direction. At this time, the frame region FLA2 includes a region FLA21 arranged along the side portion DPAs21. In such a case, as described later with reference to FIGS. 4 and 12, some connection wirings and/or RGB switches of the connection wirings that connect the video lines and the video line driving circuit CS and of RGB switches used for supplying output of the video signal driving circuit CS to the video lines in a time division manner are arranged in the region FLA21. The video lines SL that are connected to some connection wirings and/or RGB switches arranged in the region FLA21 and extend in the Y-axis direction are provided so as to intersect the side portion DPAs21 in a plan view.

In FIG. 1, a region of the region FLA21 in which the connection wirings and the RGB switches connected to the video lines intersecting the side portion DPAs21 are arranged is indicated as a region FLA21a.

In the example illustrated in FIG. 1, a side portion DPAs41 which is a portion on the negative side in the Y-axis direction (the lower side in FIG. 1) in the side portion DPAs4 of the display region DPA has such a shape as being located closer to the negative side in the X-axis direction (the left side in FIG. 1) as being closer to the positive side in the Y-axis direction (the upper side in FIG. 1). That is, the side portion DPAs4 is convex toward the negative side in the X-axis direction. At this time, the frame region FLA4 includes a region FLA41 arranged along the side portion DPAs41. In such a case, as described later with reference to FIGS. 4 and 12, some connection wirings and/or RGB switches of the connection wirings that connect the video lines and the video line driving circuit CS and/or the RGB switches that supply output of the video signal driving circuit CS to the video lines in a time division manner are arranged in the region FLA41. The video lines SL that are connected to some connection wires and/or RGB switches arranged in the region FLA41 and extend in the Y-axis direction are provided so as to intersect the side portion DPAs41 in a plan view.

In FIG. 1, a region of the region FLA41 in which the connection wirings and/or the RGB switches connected to the video lines intersecting the side portion DPAs41 are arranged is indicated as a region FLA41a. Note that the present embodiment is not limited to the configuration in which the RGB switches are provided between the connection wirings and the video lines, and one-on-one connection of wirings and the video lines without providing RGB switches may be applicable.

Figure 11:
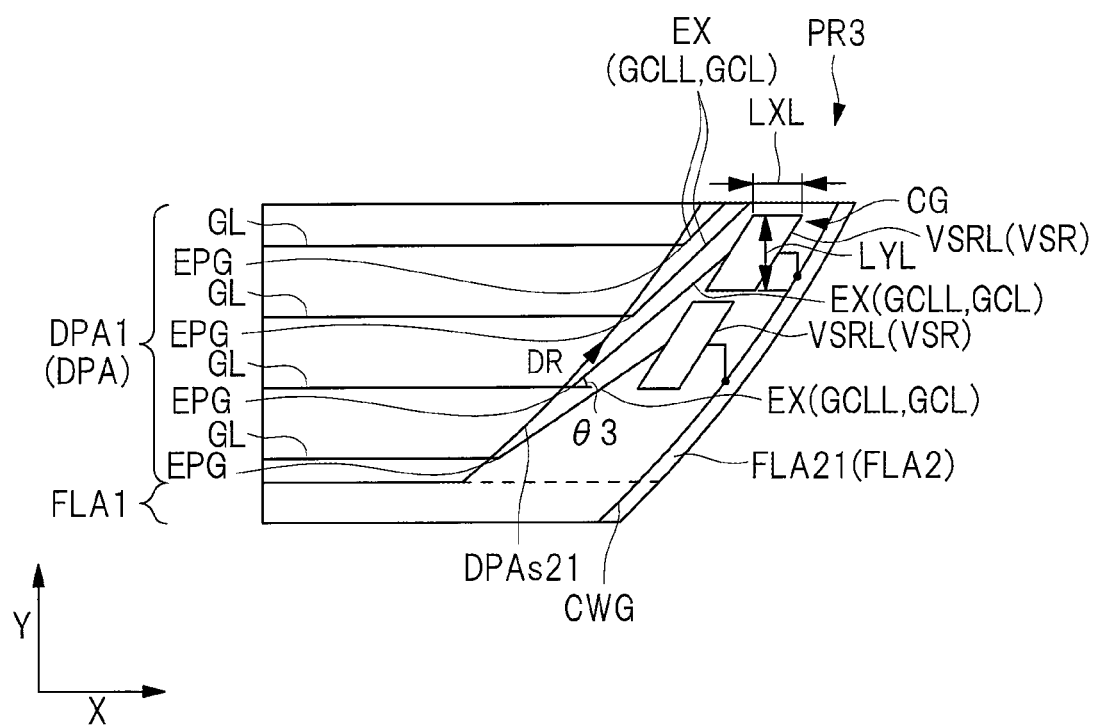
FIG. 11 is a plan view illustrating a layout of a transfer circuit in a frame region in a display apparatus according to the first embodiment.

That is, in the example illustrated in FIG. 11, the side portion DPAs21 has such a shape as being located closer to the positive side in the X-axis direction as being closer to the positive side in the Y-axis direction, and the side portion DPAs41 has such a shape as being located closer to the negative side in the X-axis direction as being closer to the positive side in the Y-axis direction. In such a case, in a region DPA1 of the display region DPA, which is a portion located between the side portion DPAs21 and the side portion DPAs41, a length of a scanning line GL is longer as being closer to the positive side in the Y-axis direction (the upper side in FIG. 1) as described later with reference to FIG. 4.

In the example illustrated in FIG. 1, a side portion DPAs22 which is a portion on the positive side in the Y-axis direction (the upper side in FIG. 1) in the side portion DPAs2 of the display region DPA has such a shape as being located closer to the negative side in the X-axis direction (the left side in FIG. 1) as being closer to the positive side in the Y-axis direction (the upper side in FIG. 1). At this time, the frame region FLA2 includes a region FLA22 arranged along the side portion DPAs22. An end of the side portion DPAs22 on the negative side in the Y-axis direction (the lower side in FIG. 1) is connected to an end of the side portion DPAs21 on the positive side in the Y-axis direction. An end of the region FLA22 on the negative side in the Y-axis direction is connected to an end of the region FLA21 on the positive side in the Y-axis direction.

In the example illustrated in FIG. 1, a side portion DPAs42 which is a portion on the positive side in the Y-axis direction (the upper side in FIG. 1) in the side portion DPAs4 of the display region DPA has such a shape as being closer to the positive side in the X-axis direction (the right side in FIG. 1) as being closer to the positive side in the Y-axis direction (the upper side in FIG. 1). At this time, the frame region FLA4 includes a region FLA42 arranged along the side portion DPAs42. An end of the side portion DPAs42 on the negative side in the Y-axis direction (the lower side in FIG. 1) is connected to an end of the side portion DPAs41 on the positive side in the Y-axis direction. An end of the region FLA42 on the negative side in the Y-axis direction is connected to an end of the region FLA41 on the positive side in the Y-axis direction.

That is, in the example illustrated in FIG. 1, the side portion DPAs22 has such a shape as being located closer to the negative side in the X-axis direction as being closer to the positive side in the Y-axis direction, and the side portion DPAs42 has such a shape as being located closer to the positive side in the X-axis direction as being closer to the positive side in the Y-axis direction. In such a case, in a region DPA2 of the display region DPA, which is a portion located between the side portion DPAs22 and the side portion DPAs42, a length of a scanning line GL is shorter as being closer to the positive side in the Y-axis direction (the upper side in FIG. 1) as described later with reference to FIG. 4.

<Equivalent Circuit of Display Apparatus>

Next, with reference to FIG. 4, an equivalent circuit of the display apparatus will be described. FIG. 4 is a diagram illustrating an equivalent circuit of the display apparatus according to the first embodiment.

Figure 4:
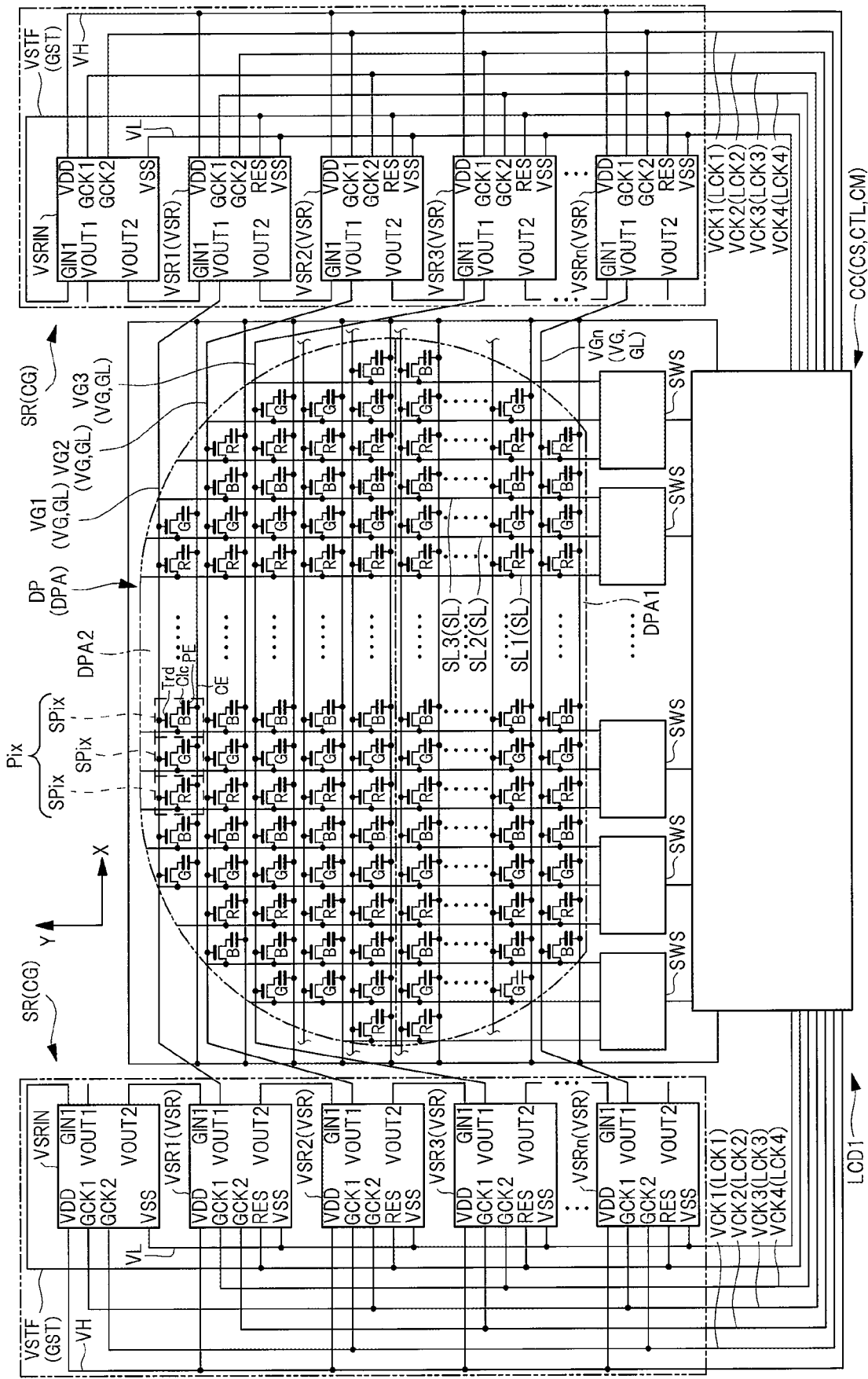
FIG. 4 is a diagram illustrating an equivalent circuit of the display apparatus according to the first embodiment.

As illustrated in FIG. 4, the display portion DP of the display apparatus LCD1 has the plurality of pixels Pix. The plurality of pixels Pix are aligned in a matrix in the X-axis direction and the Y-axis direction.

The display apparatus LCD1 has the plurality of scanning lines GL and the plurality of video lines SL. The plurality of scanning lines GL are provided in the display region DPA, extend in the X-axis direction, and are aligned in the Y-axis direction. The plurality of video lines SL are provided in the display region DPA, extend in the Y-axis direction, and are aligned in the X-axis direction. The plurality of video lines SL and the plurality of scanning lines GL intersect each other.

Each of the plurality of pixels Pix includes sub-pixels SPix for displaying R (red), G (green), and B (blue). Each of the sub-pixels SPix is provided in a region surrounded by two adjacent scanning lines GL and two adjacent video lines SL. However, such another configuration that two sub-pixels are provided in a region surrounded by two adjacent scanning lines GL and two adjacent video lines SL may be employed.

Each of the sub-pixels SPix has a transistor Trd configured by a thin-film transistor, a pixel electrode PE connected to a drain electrode of the transistor Trd, and a common electrode CE that faces the pixel electrode PE so as to interpose the liquid crystal layer therebetween. In FIG. 4, note that a liquid crystal capacitor equivalently indicating the liquid crystal layer and a storage capacitor formed between the common electrode CE and the pixel electrode PE are indicated as a capacitor Clc. Note that an electric potential of a different polarity on the basis of the common electrode CE is supplied to the pixel electrode PE, and therefore, the drain electrode and the source electrode of the thin-film transistor are switched appropriately depending on the polarity of the electric potential.

The driving circuit CC of the display apparatus LCD1 has the video line driving circuit CS, a control circuit CTL for the scanning line driving circuit CG or others, and a common electrode driving circuit CM.

The source electrodes of the transistors Trd of the plurality of sub-pixels SPix aligned in the Y-axis direction are connected to the video lines SL. The plurality of video lines SL are connected to the video line driving circuit CS that serves as an input portion to which a video signal corresponding to display data and supplied to the sub-pixels SPix are input. That is, the plurality of video lines SL connect the plurality of sub-pixels SPix and the video line driving circuit CS.

The gate electrodes of the transistors Trd of the plurality of sub-pixels SPix aligned in the X-axis direction are connected to the scanning lines GL. Each scanning line GL is connected to the scanning line driving circuit CG that supplies a scanning signal supplied to each sub-pixel SPix. That is, the plurality of scanning lines GL connect the plurality of sub-pixels SPix and the scanning line driving circuit CG.

The control circuit CTL controls the video line driving circuit CS, the scanning line driving circuit CG, and the common electrode driving circuit CM based on display data transmitted from an outside of the display apparatus and display control signals such as a clock signal and a display timing signal.

The control circuit CTL appropriately converts the display data and the display control signals supplied from the outside depending on the alignment of the sub-pixels of the display apparatus, on a display method, on the presence or absence of the RGB switch, on the presence or absence of a touch panel, or others, and then, outputs the display data and the display control signals to the video line driving circuit CS, the scanning line driving circuit CG, and the common electrode driving circuit CM.

The video line SL connected to each of the sub-pixels SPix has video lines SL1, SL2, and SL3. The video lines SL1, SL2, and SL3 are connected to an RGB switch circuit SWS. The video line SL1 is a video line for R (red) that is connected to the sub-pixel SPix for displaying R (red) color. The video line SL2 is a video line for G (green) that is connected to the sub-pixel SPix for displaying G (green) color different from R (red) color. The video line SL3 is a video line for B (blue) that is connected to the sub-pixel SPix for displaying B (blue) color different from both of R (red) color and G (green) color.

Specifically, the video line SL1 is connected to the plurality of sub-pixels SPix each displaying R (red) color and aligned in the Y-axis direction. The video line SL2 is connected to the plurality of sub-pixels SPix each displaying G (green) color and aligned in the Y-axis direction. The video line SL3 is connected to the plurality of sub-pixels SPix each displaying B (blue) color and aligned in the Y-axis direction.

As described above, the plurality of video lines SL extend in the Y-axis direction and are aligned in the X-axis direction. Each of the video lines SL1, SL2, and SL3 extends in the Y-axis direction. In the present first embodiment, note that each of the plurality of sub-pixels SPix is provided in a region surrounded by two adjacent scanning lines GL and two adjacent video lines SL.

The RGB switch circuit SWS is a selection portion that selectively connects the video lines SL1, SL2, and SL3 to the video line driving circuit CS. The RGB switch circuit SWS has a switching element that is made of, for example, a thin-film transistor. The control circuit CTL switches the RGB switch so that the plurality of sub-pixels SPix for displaying R (red) color, the plurality of sub-pixels SPix for displaying G (green) color, and the plurality of sub-pixels SPix for displaying B (blue) color are selectively connected to the video line driving circuit CS.

Note that the RGB switch circuit is referred to simply as an RGB switch or referred to as a signal line switch or a time division switch in some cases. In the present specification, note that one RGB switch circuit is provided for three video lines connected to red, green, and blue sub-pixels. However, one RGB switch circuit may be provided for two video lines connected to two sub-pixels. Alternatively, one RGB switch circuit may be provided for six video lines connected to two pixels, i.e., six sub-pixels. The number of time divisions can be set to any number depending on a writing status of a video signal into each sub-pixel and a processing performance of the video line driving circuit.

<Configuration of Scanning Line Driving Circuit>

Figure 5:
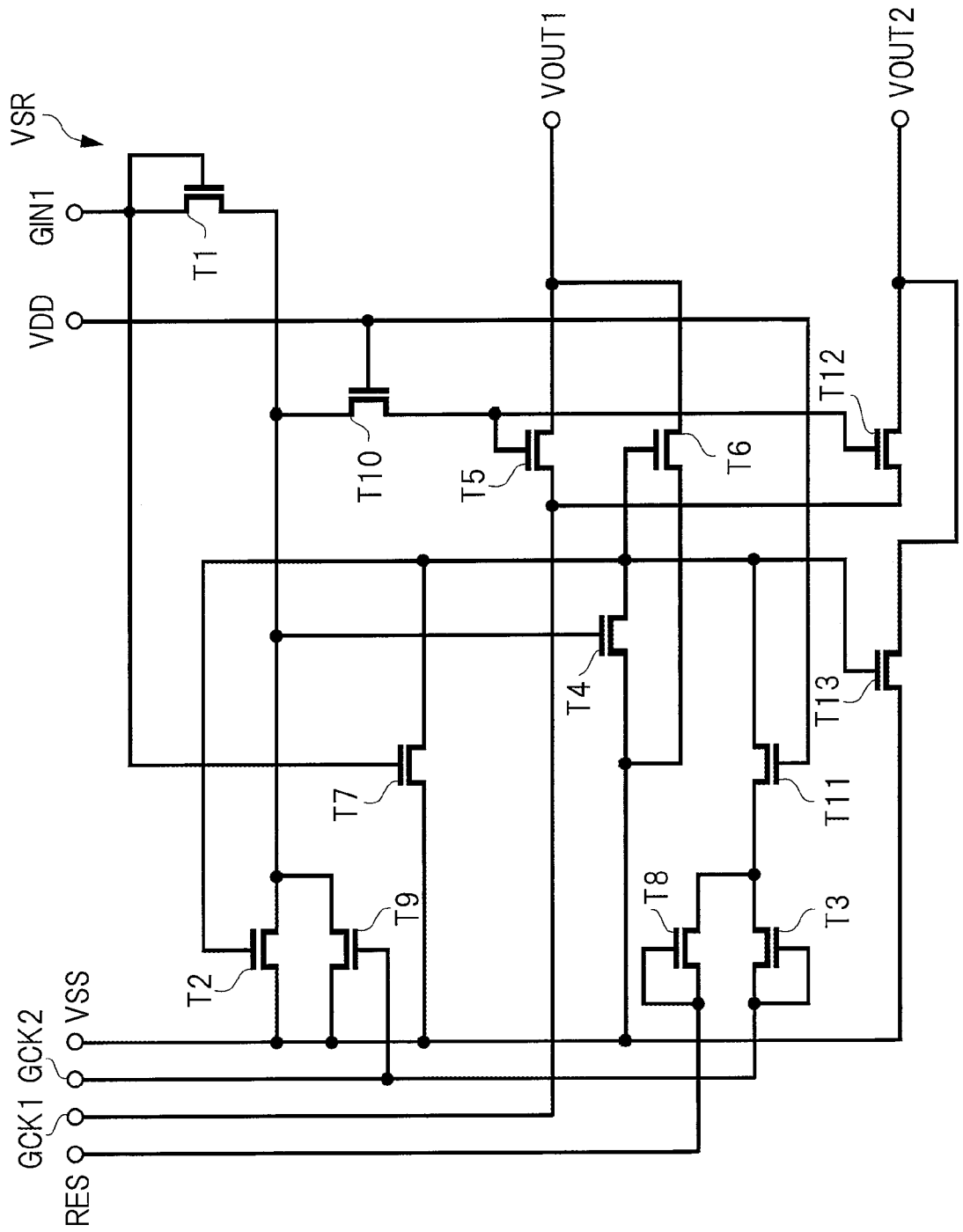
FIG. 5 is a diagram illustrating an equivalent circuit of a transfer circuit included in the scanning line driving circuit of the display apparatus according to the first embodiment.
Figure 6:
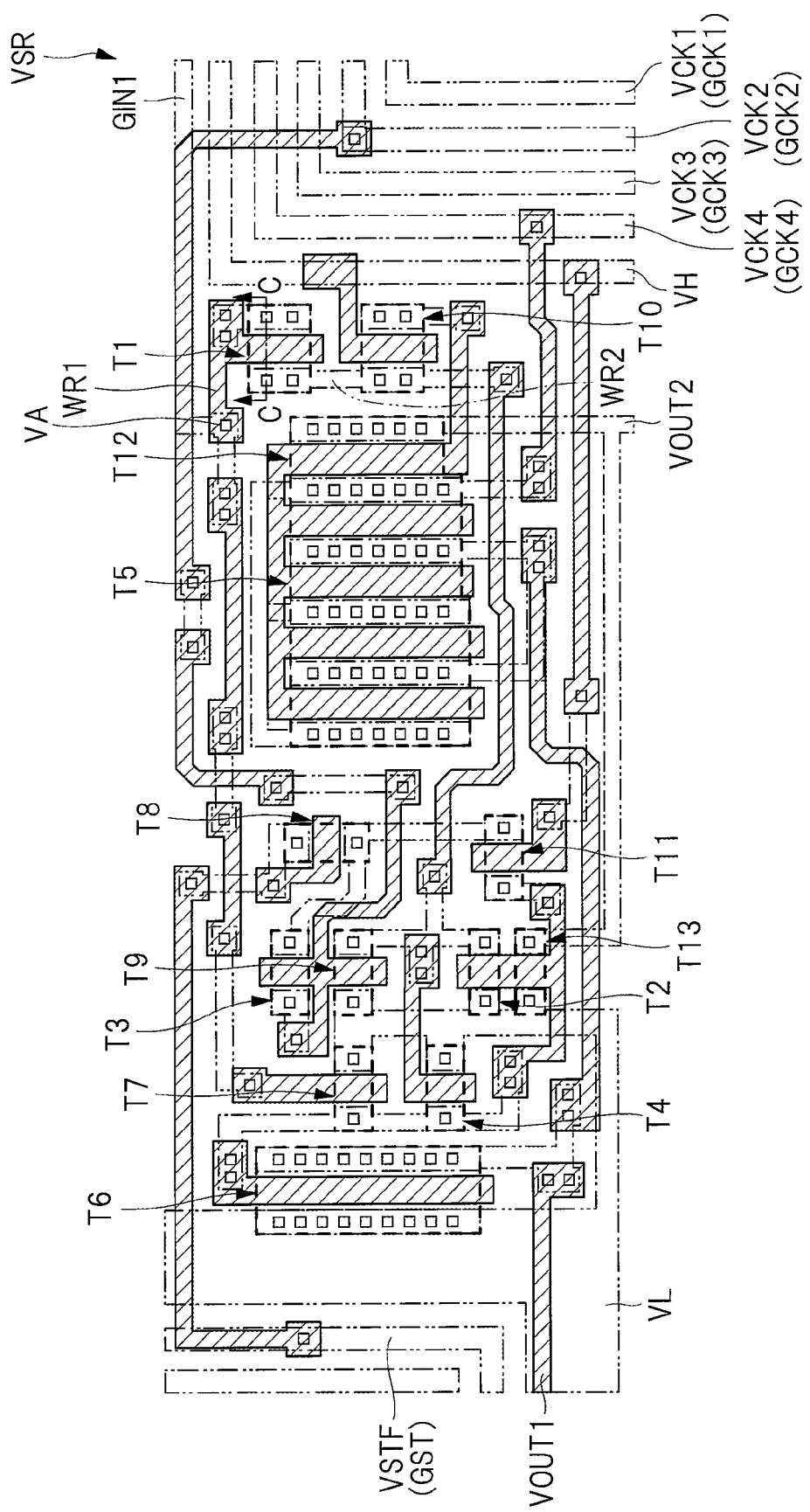
FIG. 6 is a plan view illustrating an example of a layout of the transfer circuit included in the scanning line driving circuit of the display apparatus according to the first embodiment.
Figure 7:
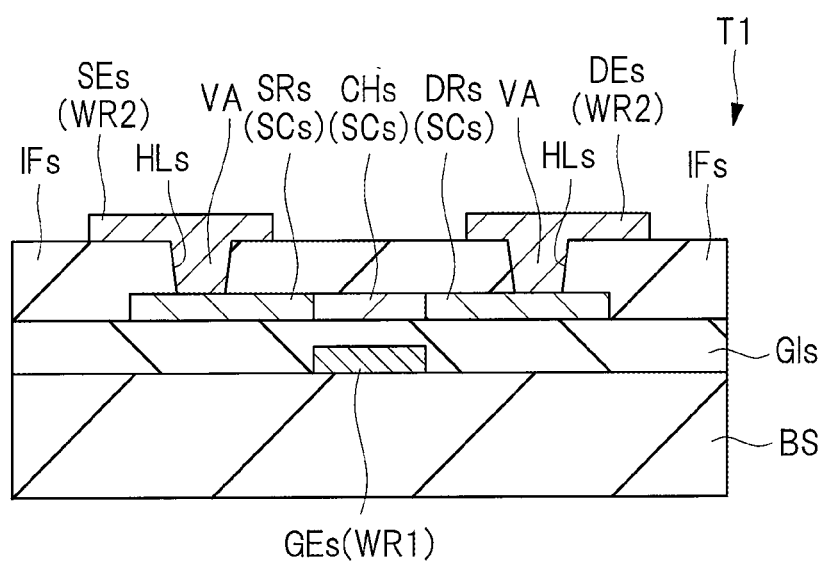
FIG. 7 is a cross-sectional view illustrating a configuration of a transistor included in the transfer circuit.

Next, with reference to FIGS. 4, 5, and 7, a configuration of the scanning line driving circuit CG will be described. FIG. 5 is a diagram illustrating an equivalent circuit of a transfer circuit included in the scanning line driving circuit of the display apparatus according to the first embodiment. FIG. 6 is a plan view illustrating an example of a layout of the transfer circuit included in the scanning line driving circuit of the display apparatus according to the first embodiment. FIG. 7 is a cross-sectional view illustrating a configuration of a transistor included in the transfer circuit. FIG. 7 is a cross-sectional view taken along a line C-C in FIG. 6.

As illustrated in FIG. 4, the scanning line driving circuit CG includes a shift register SR and sequentially selects the scanning lines GL of the display portion DP.

To the scanning line driving circuit CG, signals VCK1, VCK2, VCK3, and VCK4 and a reset signal VSTF are supplied by the driving circuit CC. The signals VCK1, VCK2, VCK3, and VCK4 are clock signals (clock) for signal transfer operation (shift operation) of the shift register SR.

The shift register SR generates scanning signal VG1, VG2, VG3, ... VGn (n is a natural number) to be supplied to each of the scanning lines GL of the display portion DP based on the supplied clock signals. The shift register SR is formed on the front surface BSf of the substrate BS (see FIG. 1). The shift register SR includes a plurality of transfer circuits VSR1, VSR2, VSR3, ... VSRn.

Hereinafter, the term "scanning signal VG" is appropriately used for representing any one of the scanning signals VG1 or others. Similarly, the term "transfer circuit VSR" is appropriately used for representing any one of the transfer circuits VSR1 or others.

The transfer circuit VSR is a circuit that performs shift operation of temporarily storing an input shift signal and sequentially transferring the shift signal to a next proceeding stage in synchronization with any of the signals VCK1, VCK2, VCK3, and VCK4 that serve as clock signals. Furthermore, the transfer circuit VSR is a circuit that performs the shift operation, and besides, when the shift signal is stored, supplies an output signal (a scanning signal VG) to a corresponding scanning line GL. By the shift operation of the transfer circuit VSR, scanning signals are sequentially supplied to the scanning lines GL, and video signals are sequentially written into sub-pixels to which the scanning signals have been supplied.

Each transfer circuit VSR has input terminals GIN1, VDD, GCK1, GCK2, RES, and VSS and output terminals VOUT1 and VOUT2.

To the input terminal VDD of each transfer circuit VSR, a high electric potential line VH fixed to a high electric potential is connected, and a high electric potential is applied. To the input terminal VSS of each transfer circuit VSR, a low electric potential line VL fixed to a low electric potential is connected, and a low electric potential is applied.

To the input terminal GCK1 of each of the transfer circuits VSR, any one of the signals VCK1, VCK2, VCK3, and VCK4 that serve as the clock signal is alternately supplied for each transfer circuit VSR. Specifically, for example, to the input terminal GCK1 of the transfer circuit VSR1, a clock signal line LCK3 is connected, and the signal VCK3 serving as a clock signal is input from the clock signal line LCK3. To the input terminal GCK1 of the transfer circuit VSR2, a clock signal line LCK1 is connected, and the signal VCK1 serving as a clock signal is input from the clock signal line LCK1. To the input terminal GCK1 of the transfer circuit VSR3, a clock signal line LCK2 is connected, and the signal VCK2 serving as a clock signal is input from the clock signal line LCK2.

To the input terminal GCK2 of each of the transfer circuits VSR, a signal of the signals VCK1, VCK2, VCK3, and VCK4 serving as the clock signals, which is different from a signal input to the input terminal GCK1, is supplied. Specifically, for example, to the input terminal GCK2 of the transfer circuit VSR1, the clock signal line LCK2 is connected, and the signal VCK2 serving as a clock signal is input from the clock signal line LCK2. To the input terminal GCK2 of the transfer circuit VSR2, the clock signal line LCK3 is connected, and the signal VCK3 serving as a clock signal is input from the clock signal line LCK3. To the input terminal GCK2 of the transfer circuit VSR3, a clock signal line LCK4 is connected, and the signal VCK4 serving as a clock signal is input from the clock signal line LCK4. The clock signal lines LCK1, LCK2, LCK3, and LCK4 supply clocks to the shift register.

To the input terminal GIN1 of each transfer circuit VSR, the output terminal VOUT2 of a transfer circuit VSR on an upstream side, that is, at a previous stage of the transfer circuit VSR is connected, and an output signal is output from the output terminal VOUT2.

Each transfer circuit VSR outputs a signal input to the input terminal GIN1 as a scanning signal VG from the output terminal VOUT1 in synchronization with any of the signals VCK1, VCK2, VCK3, and VCK4. To the output terminal VOUT1 of each transfer circuit VSR, a scanning line GL is connected, and the scanning signal VG is supplied from the output terminal VOUT1 of each transfer circuit VSR to the scanning line GL.

Each transfer circuit VSR outputs a signal input to the input terminal GIN1 from the output terminal VOUT2 in synchronization with any of the signals VCK1, VCK2, VCK3, and VCK4. To the output terminal VOUT2 of each transfer circuit VSR, the input terminal GIN1 of a transfer circuit VSR on a downstream side of the transfer circuit VSR, that is, at a proceeding stage from the transfer circuit VSR is connected, and a signal output from the output terminal VOUT2 of the transfer circuit VSR is supplied to the input terminal GIN1 of the transfer circuit VSR on a downstream side of the transfer circuit VSR, that is, at the proceeding stage from the transfer circuit VSR.

To the input terminal RES of each transfer circuit VSR, a reset signal line GST is connected, and the reset signal VSTF is supplied from the reset signal line GST. Note that the output terminal VOUT2 may be configured to perform not the input to the transfer circuit at a proceeding stage but the input to a transfer circuit at a stage proceeding to a plurality of stages. In the preset embodiment, the shift register is driven by the four clock signals, but the number of clock signals is not limited to four. Also, a scanning line driving circuit is configured to be provided on both sides of one scanning line in the X-axis direction so as to drive the one scanning line from both sides. However, one scanning line may be driven by a left transfer circuit, and another scanning line may be driven by a right transfer circuit.

As illustrated in FIG. 6, note that the transfer circuit VSR has a wiring WR1 formed in the same wiring layer as a gate electrode of each transistor. Furthermore, the transfer circuit VSR has a wiring WR2 formed in the same wiring layer as source/drain electrode of each transistor. The source/drain electrode and the wiring WR2 can be electrically connected to, for example, any of the gate electrode and the wiring WR1 via a via VA that is integrally formed with the source/drain electrode and the wiring WR2.

Here, with reference to FIGS. 5 and 6, an example of the transfer circuit VSR will be described.

As illustrated in FIGS. 5 and 6, each transfer circuit VSR has transistors T1 to T13. Each of the transistors T1 to T13 is an n-channel type MOS (Metal Oxide Semiconductor) transistor. Hereinafter, note that a gate electrode, a source electrode, and a drain electrode are referred to as a gate, a source, and a drain, respectively, in some cases.

The gate and one of the source and the drain of the transistor T1 are connected to the input terminal GIN1, the other one of the source and the drain of the transistor T1 is connected to one of the source and the drain of the transistor T2, to one of the source and the drain of the transistor T9, and to the gate of the transistor T4. The other one of the source and the drain of the transistor T2 and the other one of the source and the drain of the transistor T9 are connected to the input terminal VSS, and the gate of the transistor T9 is connected to the input terminal GCK2.

The gate and one of the source and the drain of the transistor T3 are connected to the input terminal GCK2, the gate and one of the source and the drain of the transistor T8 are connected to the input terminal RES, and the other one of the source and the drain of the transistor T3 is connected to the other one of the source and the drain of the transistor T8. The other one of the source and the drain of the transistor T3 is connected to one of the source and the drain of the transistor T11, and the other one of the source and the drain of the transistor T11 is connected to the gate of each of the transistors T2, T6, and T13.

One of the source and drain of the transistor T4 is connected to the input terminal VSS, and one of the source and drain of the input terminal VSS and the transistor T6, the other one of the source and drain of the transistor T4 is connected to the gate of the transistor T2, and the other one of the source and drain of the transistor T6 is connected to the output terminal VOUT1.

One of the source and drain of the transistor T5 is connected to the input terminal GCK1, and the other one of the source and drain of the transistor T5 is connected to the output terminal VOUT1. One of the source and drain of the transistor T12 is connected to the input terminal GCK1, and the other one of the source and drain of the transistor T12 is connected to the output terminal VOUT2. Each of the gates of the transistors T5 and T12 is connected to one of the source and drain of the transistor T10, and the other one of the source and drain of the transistor T10 is connected to the gate of the transistor T4. Each of the gates of the transistor T10 and the transistor T11 is connected to the input terminal VDD.

One of the source and drain of the transistor T13 is connected to the input terminal VSS, and the other one of the source and drain of the transistor T13 is connected to the output terminal VOUT2.

In the transfer circuit VSR1 configured as described above, when an electric potential higher than a certain threshold value is applied to the input terminal GIN1, the transistors T5 and T12 are turned ON, so that a scanning signal VG is output from the output terminal VOUT1, and a signal is output from the output terminal VOUT2.

As illustrated in FIG. 7, the transistor T1 is a thin-film transistor and has a gate electrode GEs, a gate insulating film GIs, a semiconductor layer SCs, a source electrode SEs, and a drain electrode DEs.

As illustrated in FIGS. 6 and 7, the gate electrode GEs in the same layer as the wiring WR1 is provided on the substrate BS. Each of the gate electrode GEs and the wiring WR1 is made of a metal such as chromium (Cr) or molybdenum (Mo) or an alloy of such metals.

The gate insulating film GIs is provided so as to cover the gate electrode GEs. That is, the gate insulating film GIs is provided so as to cover the gate electrode GEs. The gate insulating film GIs is a transparent insulating film made of a material such as silicon nitride or silicon oxide.

The semiconductor layer SCs is provided on a portion of the gate insulating film GIs, which overlaps the gate electrode GEs in a plan view. The semiconductor layer SCs is made of a material such as amorphous silicon or polycrystalline silicon.

A portion of the semiconductor layer SCs, which overlaps the gate electrode GEs in a plan view, is a channel region CHs. A portion of the semiconductor layer SCs, which is arranged on one side of the gate electrode GEs, is a source region SRs. A portion of the semiconductor layer SCs, which is arranged on the other side of the gate electrode GEs, is a drain region DRs.

The insulating film IFs is provided so as to cover the channel region CHs, the source region SRs, the drain region DRs, and an exposed portion of the gate insulating film GIs. The insulating film IFs is a transparent insulating film made of a material such as silicon nitride or silicon oxide.

A contact hole HLs that passes through the insulating film IFs and reaches the source region SRs is formed in a portion of the insulating film IFs located on the source region SRs, and a contact hole HLs that passes through the insulating film IFs and reaches the drain region DRs is formed in a portion of the insulating film IFs located on the drain region DRs.

The source electrode SEs is formed in the same layer as the wiring WR2 inside the contact hole HLs and on the insulating film IFs, and the drain electrode DEs is formed in the same layer as the wiring WR2 inside the contact hole HLs and on the insulating film IFs. The source electrode SEs is electrically connected to the source region SRs, and the drain electrode DEs is electrically connected to the drain region DRs. Each of the source electrode SEs and the drain electrode DEs is made of a metal having such a multilayer structure that aluminum (Al) is sandwiched by molybdenum (Mo) or others.

Note that the source region SRs and the drain region DRs may be replaced with each other, and the source electrode SEs and the drain electrode DEs may be replaced with each other.

As illustrated in FIG. 6, the planar shape of one transfer circuit VSR can be a rectangular shape. In the present first embodiment, as described with reference to FIGS. 9 to 12 described later, a difference is made between the planar shape of the transfer circuit VSR of the plurality of transfer circuits VSR and the shape of another transfer circuit VSR of the plurality of transfer circuit VSR, which is arranged on one side of the transfer circuit VSR in the Y-axis direction. That is, a difference is made between the planar shape of a region where one transfer circuit VSR of the plurality of transfer circuits VSR is formed and the shape of a region where another transfer circuit VSR of the plurality of transfer circuits VSR, which is arranged on one side of the one transfer circuit VSR in the Y-axis direction is formed.

Figure 8:
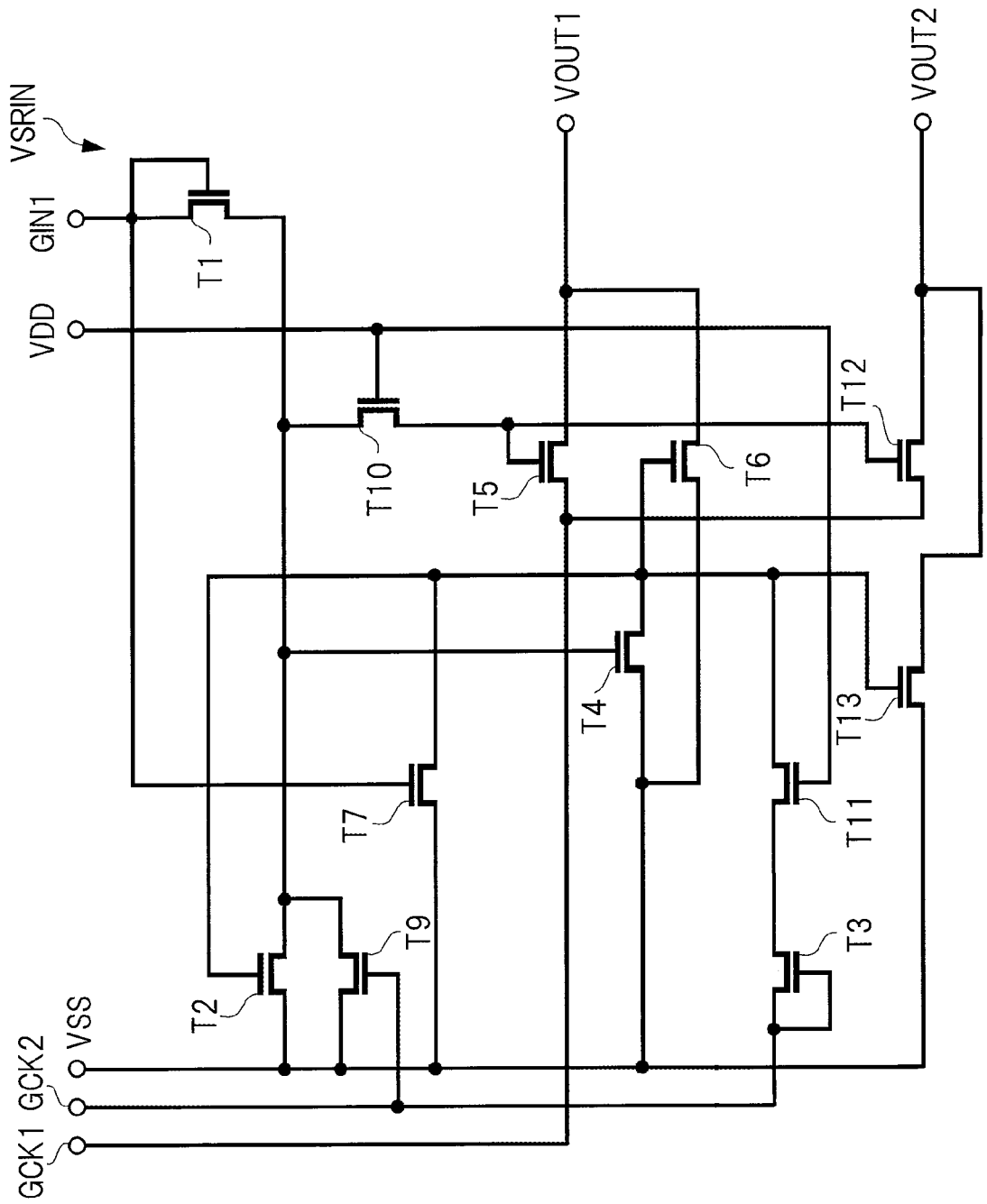
FIG. 8 is a diagram illustrating an equivalent circuit of a transfer circuit included in the scanning line driving circuit of the display apparatus according to the first embodiment.

As illustrated in FIG. 4, note that the shift register SR may have a transfer circuit VSRIN. FIG. 8 is a diagram illustrating an equivalent circuit of a transfer circuit included in the scanning line driving circuit of the display apparatus according to the first embodiment. FIG. 8 is a circuit diagram illustrating an example of a configuration of the transfer circuit VSRIN. As illustrated in FIG. 8, the transfer circuit VSRIN does not have the input terminal RES and the transistor T8 (see FIG. 5). However, the transfer circuit VSRIN can be made similar to the transfer circuit VSR except that there are no input terminal RES, transistor T8, and a wiring connected to the input terminal RES and the transistor T8 and that no scanning signal is output to a scanning line.

The scanning line driving circuit CG having such a configuration sequentially outputs a scanning signal to a scanning line GL from the positive side toward the negative side of the Y-axis or from the negative side toward the positive side thereof every horizontal period. This causes the transistors Trd of the plurality of sub-pixels SPix connected to the selected scanning line GL to be conductive for 1 horizontal period. A video signal supplied to the video line SL1, SL2, or SL3 is supplied to the pixel electrodes PE via the transistors Trd that are in a conductive state for 1 horizontal period. Finally, the capacitor Clc is charged with an electric charge so as to control the orientation of the liquid crystal molecules. In this manner, an image is displayed in the display portion DP. Note that the transfer circuit illustrated in FIG. 6 is provided in the frame region FLA2 which is a peripheral region of the display region on the positive side in the X-axis direction. A transfer circuit provided in the frame region FLA4 which is a peripheral region thereof on the negative side in the X-axis direction is the inverted one of FIG. 6. In that case, clock signal lines etc. are provided on the left side of the transfer circuit. A transistor(s) of the transfer circuit can be replaced with two or more transistors obtained by connecting the transistors in series or in parallel. The present invention is not limited to the n-channel type MOS, but can be a p-channel type MOS or can have a CMOS structure combining the n-channel type MOS and the p-channel type MOS. Also, there is description of a transistor having a bottom gate structure in which a gate electrode, a semiconductor layer, and a source/drain electrode are provided in this order from the substrate side. However, a transistor having a top gate structure in which a semiconductor layer, a gate electrode, and a source/drain electrode are provided in this order from the substrate side can be used.

<Layout of Transfer Circuits>

Figure 9:
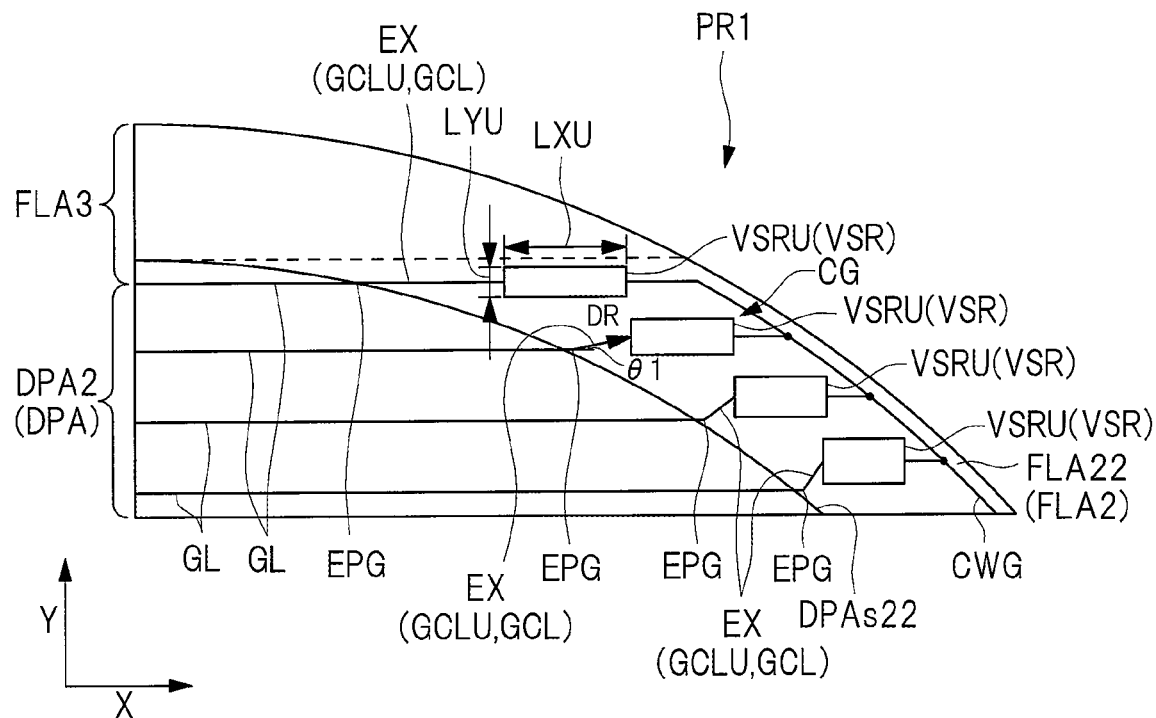
FIG. 9 is a plan view illustrating a layout of a transfer circuit in a frame region in a display apparatus according to the first embodiment.
Figure 10:
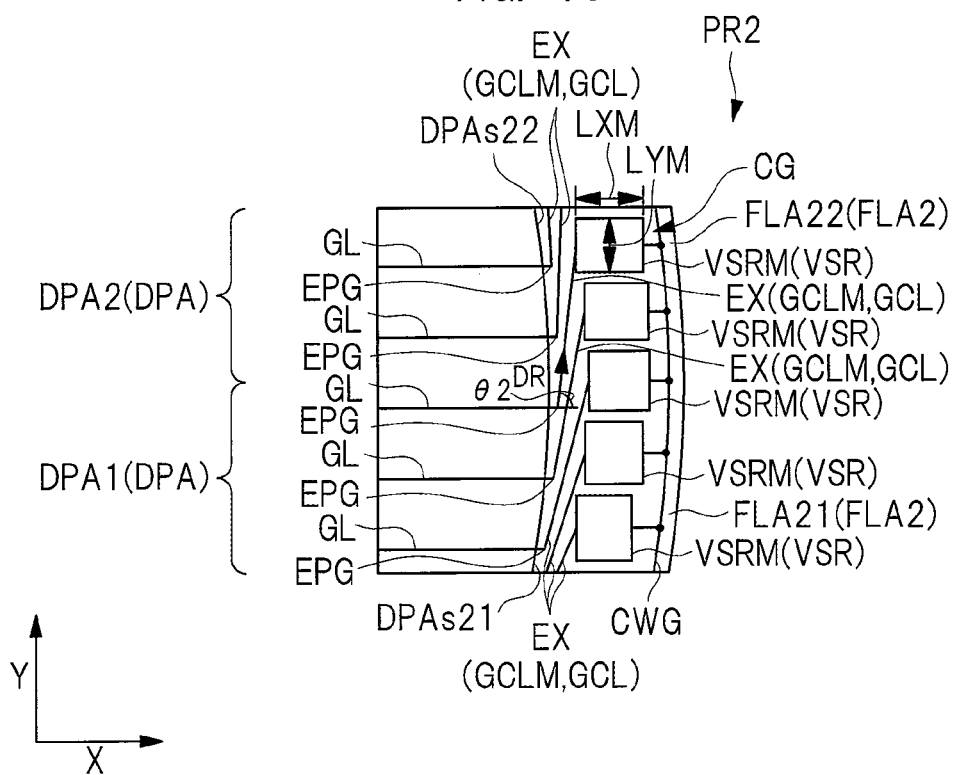
FIG. 10 is a plan view illustrating a layout of a transfer circuit in a frame region in a display apparatus according to the first embodiment.
Figure 12:
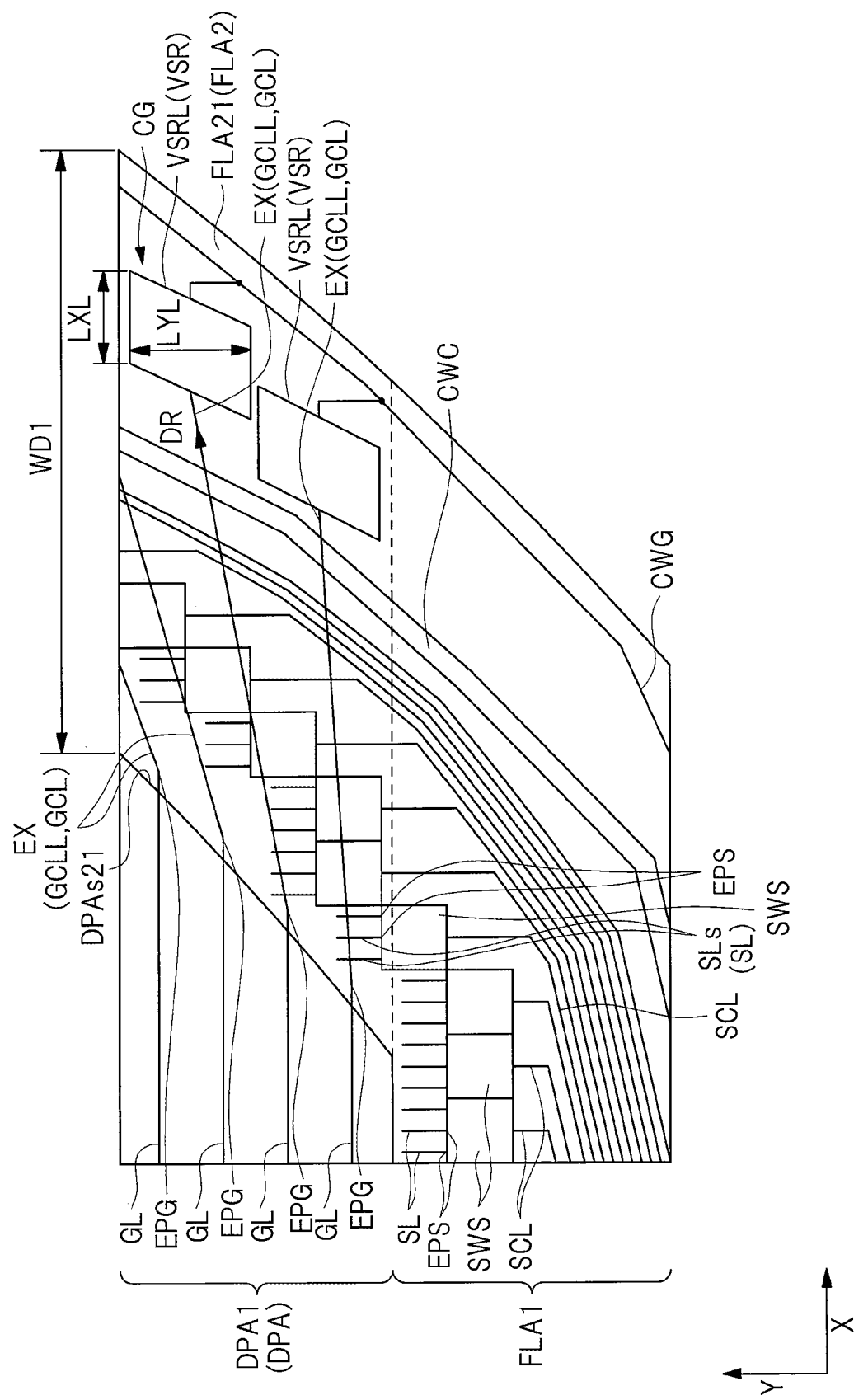
FIG. 12 is a plan view illustrating a layout of a transfer circuit in a frame region in a display apparatus according to the first embodiment.

Next, with reference to FIGS. 9 to 12, the layout of the transfer circuits will be described. FIGS. 9 to 12 are plan views illustrating the layout of the transfer circuits in the frame region in the display apparatus according to the first embodiment. FIG. 9 illustrates the layout of the transfer circuits VSR in the portion PR1 surrounded by the dashed-two dotted line in FIG. 1 so as to be enlarged. FIG. 10 illustrates the layout of the transfer circuits VSR in the portion PR2 surrounded by the dashed-two dotted line in FIG. 1 so as to be enlarged. FIG. 11 illustrates the layout of the transfer circuits VSR in the portion PR3 surrounded by the dashed-two dotted line in FIG. 1 so as to be enlarged. Note that FIG. 12 illustrates the layout of the transfer circuits VSR in the portion PR3 and in periphery of the portion PR3.

In FIGS. 9 to 12, note that the high electric potential line VH, clock signal lines LCK1 to LCK4, reset signal line GST, and low electric potential line VL illustrated in FIG. 4 are collectively indicated as a signal line CWG.

As illustrated in FIGS. 9 to 12, the display apparatus has a plurality of connection wirings GCL that connect outputs of the transfer circuits of the scanning line driving circuit CG and scanning lines. The plurality of connection wirings GCL are connected to positive-side ends EPG of the plurality of scanning lines GL in the X-axis direction. That is, the plurality of connection wirings GCL are a plurality of scanning signal connection wirings.

The plurality of connection wirings GCL and the plurality of transfer circuits VSR are provided in the regions FLA21 and FLA22. The plurality of transfer circuits VSR are connected to the ends EPG of the plurality of scanning lines GL via the plurality of connection wirings GCL, respectively.

The display region DPA includes at least the region DPA1. Even when the display region DPA has another region in addition to the region DPA1, the region DPA1 is a region of the display region DPA, which is located closest to the negative side in the Y-axis direction, i.e., closest to the frame region FLA1.

As illustrated in FIGS. 1 and 12, the positive-side side portion DPAs21 of the region DPA1 in the X-axis direction has such a shape as being located closer to the positive side in the X-axis direction as being closer to the positive side in the Y-axis direction. The scanning lines GL of the plurality of scanning lines GL, which are provided in the region DPA1, are provided so as to intersect the side portion DPAs21. The length of one scanning line GL of the scanning lines GL provided in the region DPA1 is longer than the length of another scanning line GL of the scanning lines GL arranged in the region DPA1, which is provided on the negative side of the one scanning line GL in the Y-axis direction. That is, the length of one scanning line GL of the plurality of scanning lines GL is different from the length of another scanning line GL arranged on the negative side of the one scanning line GL in the Y-axis direction.

In the layout of the video lines SL, video lines SLs arranged in a portion on the positive side in the X-axis direction are provided so as to intersect the side portion DPAs21. The video line driving circuit CS (see FIG. 1) is connected to ends EPS of the video lines SLs via connection wirings SCL, which serve as video signal connection wirings, and the RGB switch circuits SWS, respectively. That is, the plurality of connection wirings SCL are connected to the negative-side ends EPS of the plurality of video lines SL in the Y-axis direction, respectively. The connection wirings SCL and the RGB switch circuits SWS connected to the video lines SLs are arranged in a portion on the negative side in the Y-axis direction in the region FLA21 arranged along the side portion DPAs21.

In such a case, a difference is made between, for example, the shape of a transfer circuit VSR connected to an end EPG of one scanning line GL and the shaped of a transfer circuit VSR connected to an end of another scanning line GL arranged on the negative side of the one scanning line GL in the Y-axis direction. By such a method, the width WD1 of a portion on the negative side in the Y-axis direction in the region FLA21 arranged along the side portion DPAs21 can be smaller than that in a case in which the shapes of the transfer circuits VSR connected to the ends EPG of all of the scanning lines GL are the same as each other.

For example, a difference can be made between the length of a transfer circuit VSR in the X-axis direction that is connected to an end EPG of one scanning line GL and the length of a transfer circuit VSR in the X-axis direction that is connected to an end EPG of another scanning line GL arranged on the negative side of the one scanning line GL in the Y-axis direction. Specifically, the length of a transfer circuit VSR in the X-axis direction that is connected to an end EPG of one scanning line GL can be made longer than the length of a transfer circuit VSR in the X-axis direction that is connected to an end EPG of another scanning line GL arranged on the negative side of the one scanning line GL in the Y-axis direction.

Furthermore, a difference can be made between, for example, the length of a transfer circuit VSR in the Y-axis direction that is connected to an end EPG of one scanning line GL and the length of a transfer circuit VSR in the Y-axis direction that is connected to an end EPG of another scanning line GL arranged on the negative side of the one scanning line GL in the Y-axis direction. Specifically, the length of a transfer circuit VSR in the Y-axis direction that is connected to an end EPG of one scanning line GL can be made shorter than the length of a transfer circuit VSR in the Y-axis direction that is connected to an end EPG of another scanning line GL arranged on the negative side of the one scanning line GL in the Y-axis direction.

Furthermore, a difference can be made between, for example, an aspect ratio which is a ratio of the length of a transfer circuit VSR that is connected to an end EPG of one scanning line GL in the Y-axis direction with respect to the length thereof in the X-axis direction and an aspect ratio of a transfer circuit VSR that is connected to an end EPG of another scanning line GL arranged on the negative side of the one scanning line GL in the Y-axis direction. Specifically, an aspect ratio which is a ratio of the length of a transfer circuit VSR that is connected to an end EPG of one scanning line GL in the Y-axis direction with respect to the length thereof in the X-axis direction can be made smaller than the aspect ratio of a transfer circuit VSR that is connected to an end EPG of another scanning line GL arranged on the negative side of the one scanning line GL in the Y-axis direction.

Note that the area of a transfer circuit VSR that is connected to one scanning line GL may be equal to the area of a transfer circuit VSR that is connected to another scanning line GL arranged on the negative side of the one scanning line GL in the Y-axis direction. Alternatively, when the numbers of sub-pixels SPix connected to the respective scanning lines GL are different from each other, a difference may be made between the area of a transfer circuit VSR connected to one scanning line GL and the area of a transfer circuit VSR connected to another scanning line GL arranged on the negative side of the one scanning line in the Y-axis direction so as to correspond to the respective numbers of sub-pixels SPix. That is, in the rectangular display, the lengths of the scanning lines are the same as each other. However, in the variant display, the lengths of the scanning lines are different depending on a position in the Y-axis direction. Accordingly, when the length of one scanning line is shorter than the length of the scanning line, the size of a transistor included in a transfer circuit connected to the scanning line can be made smaller that the size of a transistor included in a transfer circuit connected to the one scanning line in order to suppress the performance of the transfer circuit. When the length of one scanning line is longer, the size of the transistor included in the transfer circuit can be larger in order to increase the performance of the transfer circuit.

Alternatively, the plurality of connection wirings GCL connected to the ends EPG of the plurality of scanning lines GL include extensions EX that extend in a direction DR, respectively. And, a difference is made between, for example, a direction DR in which an extension EX included in a connection wiring GCL connected to an end EPG of one scanning line GL extends and a direction DR in which an extension EX included in a connection wiring GCL connected to an end EPG of another scanning line GL arranged on the negative side of the one scanning line GL in the Y-axis direction extends.

By such a method, each of the plurality of transfer circuits VSR is easier to be arranged on the positive side in the Y-axis direction than in a case in which the extending directions of the extensions EX included in the connection wirings GCL connected to the ends EPG of all of the scanning lines GL are same as each other. Therefore, the width WD1 of a portion on the negative side in the Y-axis direction in the region FLA21 arranged along the side portion DPAs21 can be narrowed.

For example, a connection wiring GCL connected to an end EPG of one scanning line GL includes an extension EX extending in a direction DR, and a connection wiring GCL connected to an end EPG of another scanning line GL arranged on the negative side of the one scanning line GL in the Y-axis direction includes an extension EX extending in a direction DR different from the direction DR.

At this time, a difference is made between an angle formed between the X-axis direction and the direction DR in which the extension EX included in the connection wiring GCL connected to the one scanning line GL extends and an angle formed between the X-axis direction and the direction DR in which the extension EX included in the connection wiring GCL connected to the other scanning line GL arranged on the negative side of the one scanning line in the Y-axis direction extends.

In the present first embodiment, note that it is only necessary that the shapes of two transfer circuits VSR are different from each other or that the directions DR in which the respective extensions EX of two connection wirings GCL extend are different from each other as different from the second embodiment described later.

In the example illustrated in FIG. 1, the display region DPA includes the region DPA1 and the region DPA2 that is located on the positive side of the region DPA1 in the Y-axis direction.

In the example illustrated in FIG. 1, the positive-side side portion DPAs22 of the region DPA2 in the X-axis direction is provided so as to have such a shape as located closer to the negative side in the X-axis direction as being closer to the positive side in the Y-axis direction. The scanning lines GL provided in the region DPA2 intersect the side portion DPAs22 or reach the vicinity of the side portion DPAs22. The length of one scanning line GL of the scanning lines GL provided in the region DPA2 is shorter than the length of another scanning line GL of the scanning lines GL provided in the region DPA2, the another scanning line being arranged on the negative side of the one scanning line GL in the Y-axis direction.

Assume a case that the respective shapes of the transfer circuits VSR are the same as each other as described with reference to FIG. 15 described later, the case being a case that the display region DPA has at least the region DPA1 even when the display region DPA has the region DPA2. In such a case, the width WD1 of a portion on the negative side in the Y-axis direction in the region FLA21 arranged along the side portion DPAs21 cannot be narrowed. On the other hand, as illustrated in FIGS. 9 to 12, in a case that the respective shapes of the transfer circuits VSR are different from each other, the width WD1 of a portion on the negative side in the Y-axis direction in the region FLA21 arranged along the side portion DPAs21 can be narrowed.

As seen in FIG. 9 which illustrates the layout of transfer circuits in the portion PR1 in FIG. 1, assume that the transfer circuit VSR provided in a portion on the positive side in the Y-axis direction in the region FLA22 is a transfer circuit VSRU. Furthermore, as seen in FIG. 10 which illustrates the layout of transfer circuits in the portion PR2 in FIG. 1, assume that the transfer circuit VSR provided in a portion on the negative side in the Y-axis direction in the region FLA22 and a portion on the positive side in the Y-axis direction in the region FLA21 is a transfer circuit VSRM. Furthermore, as seen in FIG. 11 which illustrates the layout of transfer circuits in the portion PR3 in FIG. 1, assume that the transfer circuit VSR provided in a portion on the negative side in the Y-axis direction in the region FLA21 is a transfer circuit VSRL.

At this time, a difference may be made between the shape of one transfer circuit VSRU of the plurality of transfer circuits VSRU and the shape of a transfer circuit VSRU connected to another scanning line GL arranged on the negative side of the one scanning line GL connected to the one scanning line GL in the Y-axis direction. Furthermore, a difference may be made between the shape of one transfer circuit VSRM of the plurality of transfer circuits VSRM and the shape of a transfer circuit VSRM connected to another scanning line GL on the negative side of the one scanning line GL connected to the one transfer circuit VSRM in the Y-axis direction. Furthermore, a difference may be made between the shape of one transfer circuit VSRL of the plurality of transfer circuits VSRL and the shape of another transfer circuit VSRL on the negative side of the one transfer circuit VSRL in the Y-axis direction.

For example, the length LXM of the transfer circuit VSRM in the X-axis direction may be made shorter than the length LXU of the transfer circuit VSRU in the X-axis direction, and the length LXL of the transfer circuit VSRL in the X-axis direction may be made shorter than the length LXM of the transfer circuit VSRM in the X-axis direction. Also, the length LYM of the transfer circuit VSRM in the Y-axis direction may be made longer than the length LYU of the transfer circuit VSRU in the Y-axis direction, and the length LYL of the transfer circuit VSRL in the Y-axis direction may be made longer than the length LYM of the transfer circuit VSRM in the Y-axis direction.

Furthermore, an aspect ratio of the length LYM of the transfer circuit VSRM in the Y-axis direction with respect to the length LXM of the transfer circuit VSRM in the X-axis direction may be made larger than an aspect ratio of the length LYU of the transfer circuit VSRU in the Y-axis direction with respect to the length LXU of the transfer circuit VSRU in the X-axis direction. Furthermore, an aspect ratio of the length LYL of the transfer circuit VSRL in the Y-axis direction with respect to the length LXL of the transfer circuit VSRL in the X-axis direction may be made larger than an aspect ratio of the length LYM of the transfer circuit VSRM in the Y-axis direction with respect to the length LXM of the transfer circuit VSRM in the X-axis direction.

As illustrated in FIG. 9, assume that the connection wiring GCL connected to the transfer circuit VSRU provided in the portion on the positive side in the Y-axis direction in the region FLA22 is a connection wiring GCLU. Furthermore, as illustrated in FIG. 10, assume that the connection wiring GCL connected to the transfer circuit VSRM provided in the portion on the negative side in the Y-axis direction in the region FLA22 and the portion on the positive side in the Y-axis direction in the region FLA21 is a connection wiring GCLM. Furthermore, as illustrated in FIGS. 11 and 12, assume that the connection wiring GCL connected to the transfer circuit VSRL provided in the portion on the negative side in the Y-axis direction in the region FLA21 is a connection wiring GCLL.

At this time, a difference may be made between an angle θ2 formed between the X-axis direction and a direction in which the extensions EX included in the connection wirings GCLM extend and an angle θ1 formed between the X-axis direction and a direction in which the extensions EX included in the connection wirings GCLU extend. Furthermore, a difference may be made between an angle θ3 formed between the X-axis direction and a direction in which the extensions EX included in the connection wirings GCLL extend and the angle θ2 formed between the X-axis direction and the direction in which the extensions EX included in the connection wirings GCLM extend.

Specifically, for example, the angle θ2 formed between the X-axis direction and the direction in which the extensions EX included in the connection wirings GCLM extend can be made larger than the angle θ3 formed between the X-axis direction and the direction in which the extensions EX included in the connection wirings GCLL extend.

In FIGS. 11 and 12, note that sides of the transfer circuit VSRL on the positive side and the negative side in the X-axis direction have a linear shape inclined with respect to the Y-axis direction. However, the sides of the transfer circuits VSRL on the positive side and the negative side in the X-axis direction are not required to have a linear shape, but may have, for example, a step shape.

In the example illustrated in FIGS. 1 and 4, the transfer circuits VSR and the connection wirings GCL are also provided in the frame region FLA4, and the transfer circuits VSR and the connection wirings GCL are provided symmetrically across, for example, an axis parallel with the Y-axis, and therefore, description thereof is omitted.

Note that the transfer circuit VSR may be connected via the connection wiring GCL to the ends EPG on both the positive side and the negative side in the X-axis direction, of the plurality of scanning lines GL aligned in the Y-axis direction. Alternatively, the transfer circuit VSR may be connected via the connection wiring GCL to the end EPG on the positive side in the X-axis direction, of an odd-numbered scanning line GL in the layout of the plurality of scanning lines GL, and the transfer circuit VSR may be connected via the connection wiring GCL to the end EPG on the negative side in the X-axis direction, of the even-numbered scanning line GL in the layout of the plurality of scanning lines GL.

Alternatively, the transfer circuit VSR and the connection wiring GCL may be provided only in the frame region FLA2, and no transfer circuit and no connection wiring may be provided in the frame region FLA4.

As illustrated in FIG. 12, a connection wiring CWC that connects the common electrode CE and the common electrode driving circuit CM may be provided in the region FLA21 which is the frame region FLA2. The plurality of transfer circuits VSR are provided between the connection wiring CWC and the display region DPA.

<Intersection Between Connection Wiring Connected to Scanning Line and Video Line>

Figure 13:
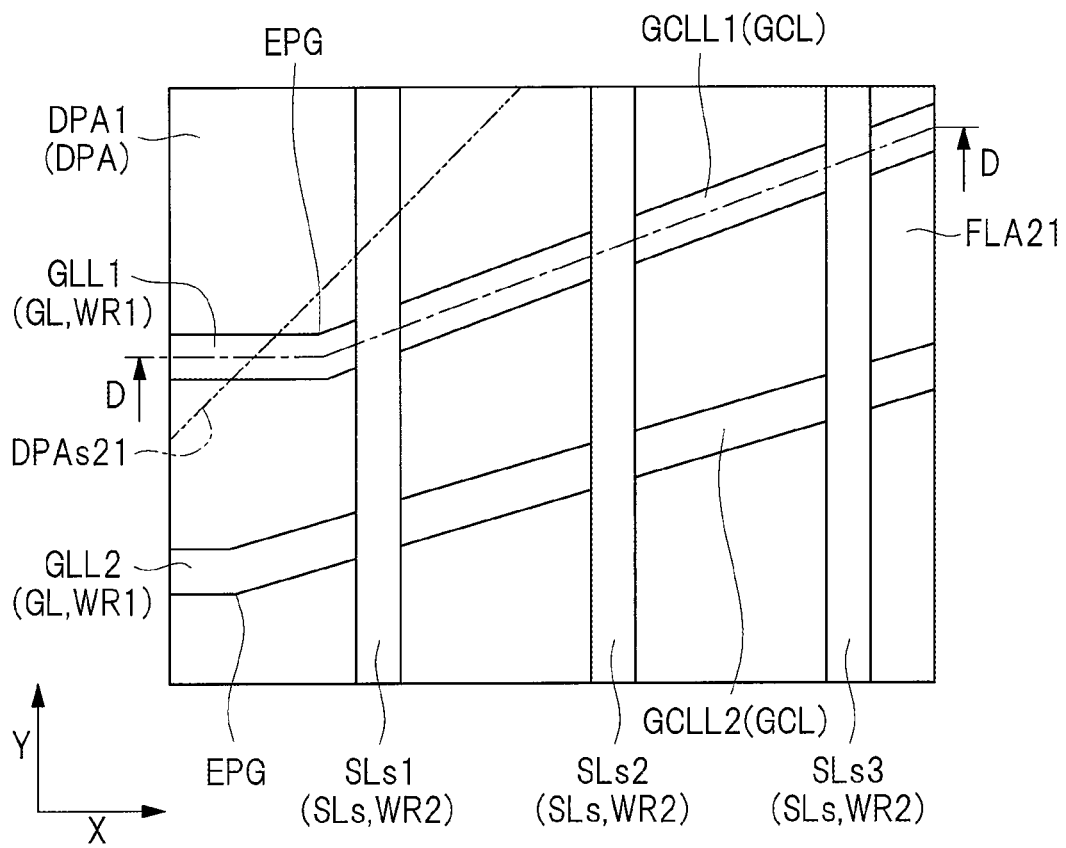
FIG. 13 is a plan view for explaining intersections between connection wirings connected to scanning lines and video lines.
Figure 14:
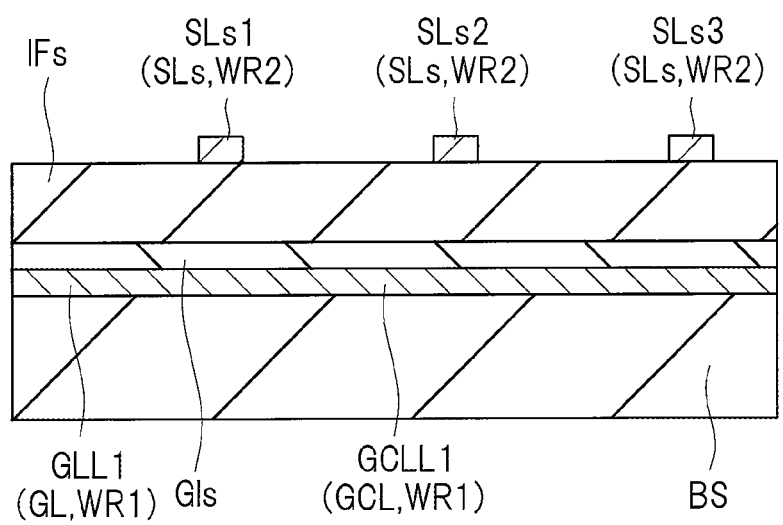
FIG. 14 is a cross-sectional view for explaining intersections between connection wirings connected to scanning lines and video lines.

Next, with reference to FIGS. 13 and 14, intersection between the connection wring GCL connected to the scanning line GL and the video line SLs will be described. FIG. 13 is a plan view for explaining intersection between the connection wring connected to the scanning line and the video line. FIG. 14 is a cross-sectional view for explaining intersection between the connection wring connected to the scanning line and the video line. FIG. 14 is a cross-sectional view taken along a line D-D in FIG. 13.

As illustrated in FIG. 13, there is a description in a case that the connection wirings GCLL1 and GCLL2 serving as the connection wirings GCL connected to the respective scanning lines GLL1 and GLL2 serving as the scanning lines GL intersect the video lines SLs1, SLs2, and SLs3 serving as the video lines SLs. Note that, although the scanning line GLL1 and the connection wiring GCLL1 will be described below, the scanning line GLL2 and the connection wiring GCLL2 can be similarly described.

As illustrated in FIGS. 13 and 14, the scanning line GLL1 and the connection wiring GCLL1 are provided on the substrate BS. The scanning line GLL1 and the connection wiring GCLL1 are provided in, for example, the same layer as the gate electrode GEs (see FIG. 7), i.e., the same layer as the wiring WR1.

The gate insulating film GIs is provided so as to cover the scanning line GLL1 and the connection wiring GCLL1. That is, the gate insulating film GIs is provided on the substrate BS so as to cover the scanning line GLL1 and the connection wiring GCLL1. The insulating film IFs is provided on the gate insulating film GIs. The video lines SLs1, SLs2, and SLs3 are provided on the insulating film IFs. The video lines SLs1, SLs2, and SLs3 are provided in, for example, the same layer as the source electrode SEs and the drain electrode DEs (see FIG. 7), i.e., the same layer as the wiring WR2. Note that, in the case of the top gate structure, no gate insulating film is provided between a scanning line and the video line.

As described above, the connection wiring GCLL1 is formed in a single layer such as the same layer as a gate electrode of a transistor included in the transfer circuit VSR in an intersection region where the connection wiring GCLL1 intersects the video lines SL1, SL2, and SL3. The video lines SLs1, SLs2, and SLs3 are formed in a single layer different from the layer in which the connection wiring GCLL1 is provided, such as the same layer as a source electrode and a drain electrode of the transistor included in the transfer circuit VSR.

In a region closer to the video line driving circuit CS side than the intersection region, note that the video line SLs may be formed from the wiring WR1 in the same layer as a scanning line, or one video line may be formed from the wiring WR1 and another video line may be formed from the wiring WR2.

<Width of Frame Region>

Next, with reference to FIG. 15, the width of the frame region will be described in comparison with a comparative example. FIG. 15 is a plan view illustrating the layout of transfer circuits in the frame region in a display apparatus of the comparative example. FIG. 15 illustrates the layout of transfer circuits in a portion corresponding to the portion PR3 surrounded by the dashed-two dotted line in FIG. 1 so as to be enlarged.

Figure 15:
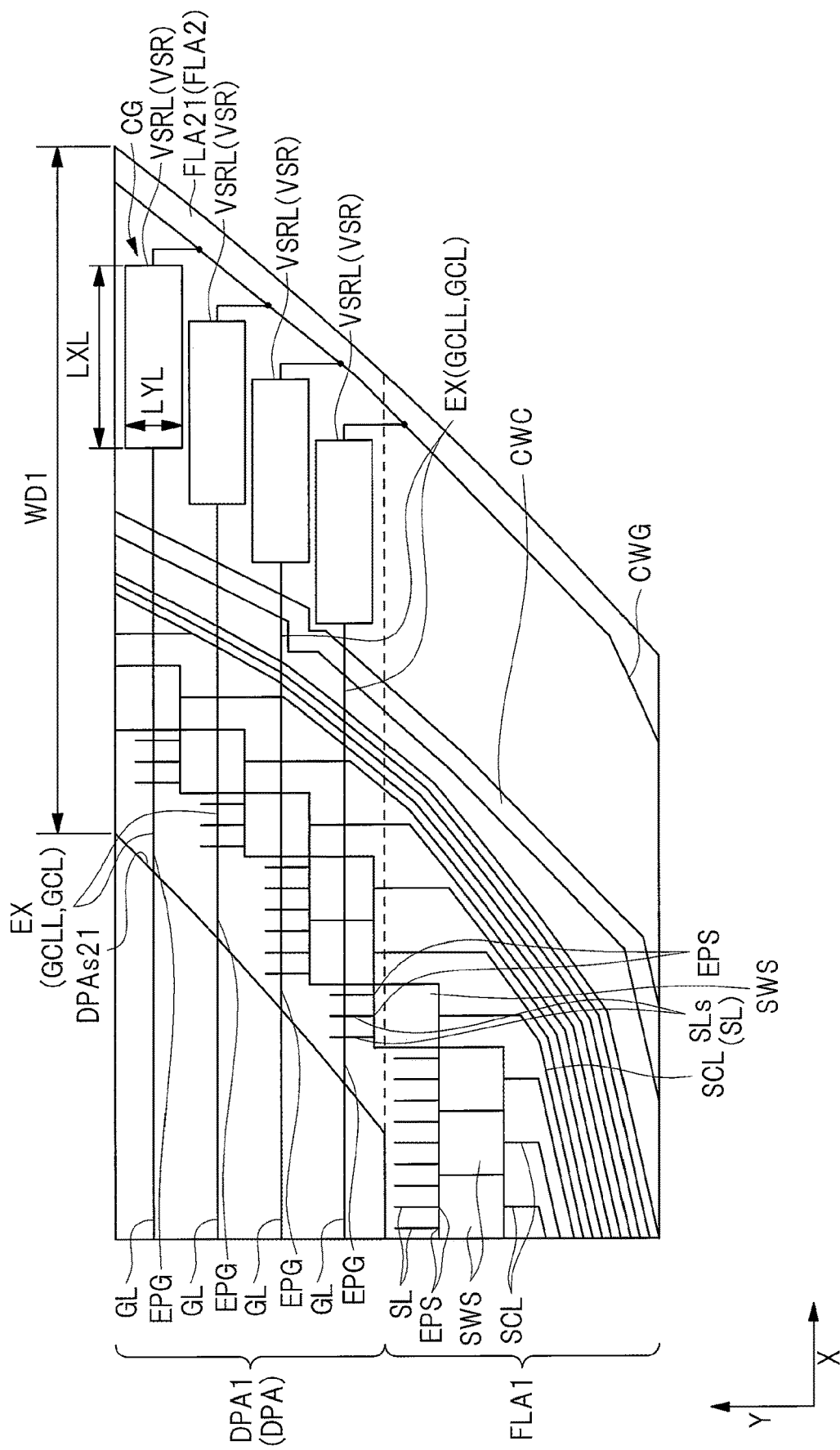
FIG. 15 is a plan view illustrating a layout of a transfer circuit in a frame region in a display apparatus according to a comparative example.

Also in the display apparatus of the comparative example, as illustrated in FIG. 15, video lines SLs arranged in a portion on the positive side in the X-axis direction in the layout of the video lines SL are provided so as to intersect the side portion DPAs21 as similar to the display apparatus according to the first embodiment. The video line driving circuit CS (see FIG. 1) is connected to the respective ends EPS of the video lines SLs via the connection wirings SCL and the RGB switch circuits SWS. In such a case, the connection wirings SCL and the RGB switch circuits SWS are arranged in a portion on the negative side in the Y-axis direction in the region FLA21 arranged along the side portion DPAs21.

Since the connection wirings SCL individually connect the plurality of transfer circuits VSR and the ends EPS of the plurality of video lines SLs, respectively, the number of connection wirings SCL provided in each portion of the region FLA21 is larger as being closer to the negative side of the region FLA21 in the Y-axis direction.

Here, in the display apparatus according to the comparative example, as illustrated in FIG. 15, the shapes of the transfer circuits VSR are the same as each other, and the connection wirings GCL extend in the X-axis direction. Accordingly, the length LXL of a transfer circuit VSR in the X-axis direction arranged in a portion on the negative side in the Y-axis direction in the region FLA21 arranged along the side portion DPAs21 cannot be shortened, and the width WD1 of a portion on the negative side in the Y-axis direction in the region FLA21 cannot be narrowed.

When the widths of the frame region FLA2 are equal to each other in portions along the side portion DPAs21 and the side portion DPAs22 (see FIG. 1) of the display region DPA, it is more difficult to narrow the width WD1 in the portion on the negative side in the Y-axis direction in the region FLA21.

As similar to the display apparatus according to the first embodiment also in the display apparatus of the comparative example, as illustrated in FIG. 15, note that a connection wiring CWC that connects the common electrode CE (see FIG. 4) and the common electrode driving circuit CM (see FIG. 4) is provided. Accordingly, it is more difficult to narrow the width WD1 of the portion on the negative side in the Y-axis direction in the region FLA21.

Meanwhile, in the display apparatus according to the first embodiment, a difference is made between the shape of a transfer circuit VSR connected to one scanning line GL of the plurality of scanning lines GL and the shape of a transfer circuit VSR connected to another scanning line GL on the negative side of the one scanning line GL in the Y-axis direction.

This manner can more shorten the X-axis direction length of a side of a transfer circuit VSR on the positive side or the negative side in the Y-axis direction, the transfer circuit VSR being arranged in a portion on the negative side in the Y-axis direction in the region FLA21 arranged along the side portion DPAs21 than that in a case in which the shapes of all of the transfer circuits VSR are the same as each other. Therefore, the width D1 of the portion on the negative side in the Y-axis direction in the region FLA21 arranged along the side portion DPAs21 can be narrowed.

Alternatively, in the display apparatus according to the first embodiment, a difference is made between a direction DR in which an extension EX included in a connection wiring GCL connected to one scanning line GL of the plurality of scanning lines GL extends and a direction DR in which an extension EX included in a connection wiring GCL connected to another scanning line GL on the negative side of the one scanning line GL in the Y-axis direction extends.

This manner allows each of the plurality of transfer circuits VSR to be arranged closer to the positive side in the Y-axis direction than a case in which extensions EX included in all of the connection wirings GCL extend in the same direction. Therefore, it is possible to shorten the length of the X-axis direction side of a transfer circuit VSR on the positive side or the negative side in the Y-axis direction, the transfer circuit VSR being arranged in a portion on the negative side in the Y-axis direction in the region FLA21 arranged along the side portion DPAs21. Therefore, it is possible to narrow the width WD1 of the portion on the negative side in the Y-axis direction in the region FLA21 arranged along the side portion DPAs21.

In other words, note that a display apparatus has: a substrate having a display region and a peripheral region that is outside the display region; a plurality of scanning lines and a plurality of video lines provided in the display region; a shift register that is provided in the peripheral region and supplies scanning signals to the plurality of scanning lines; and a plurality of scanning line connection wirings (scanning signal connection wirings) that connect the plurality of scanning lines and the shift register. A plurality of video line connection wirings (video signal connection wirings) connected to the plurality of video lines and the scanning line connection wirings intersect each other in the peripheral region. A first circuit portion of the shift register is connected to a first scanning line connection wiring of the plurality of scanning line connection wirings, and a second circuit portion of the shift register is connected to a second scanning line connection wiring different from the first scanning line connection wiring of the plurality of scanning line connection wirings.

<Modification Example of Transfer Circuit>

Figure 16:
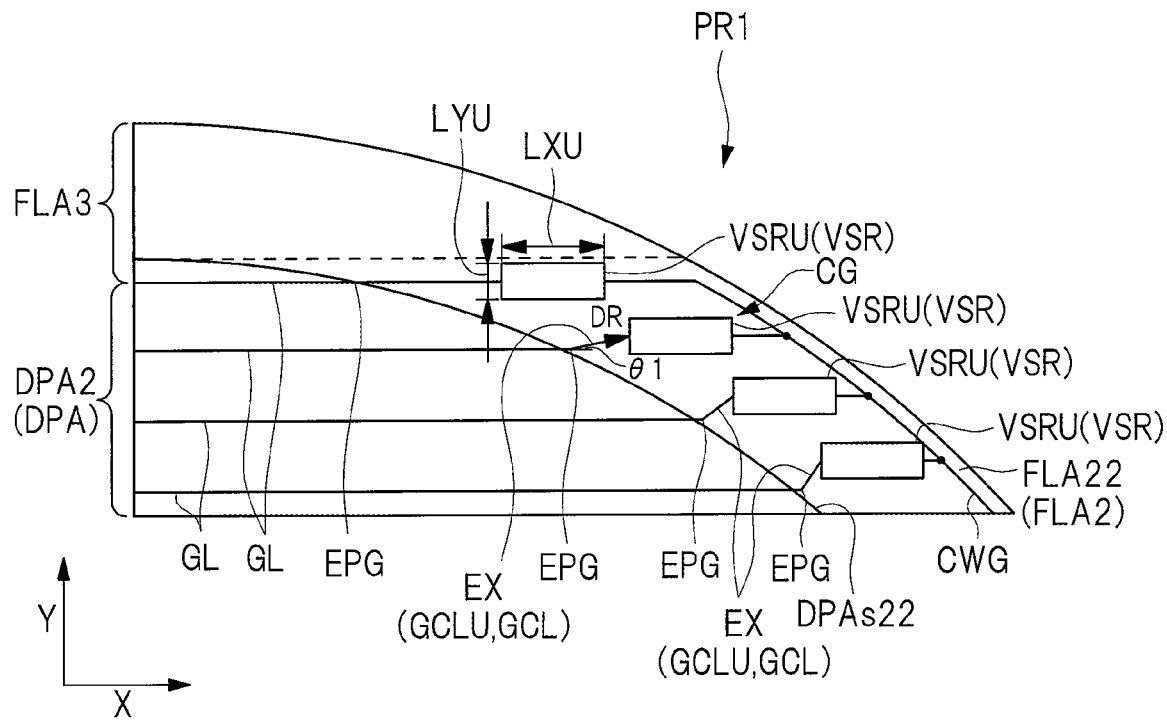
FIG. 16 is a plan view illustrating a layout of a transfer circuit in a frame region in a display apparatus according to a modified example of the first embodiment.
Figure 17:
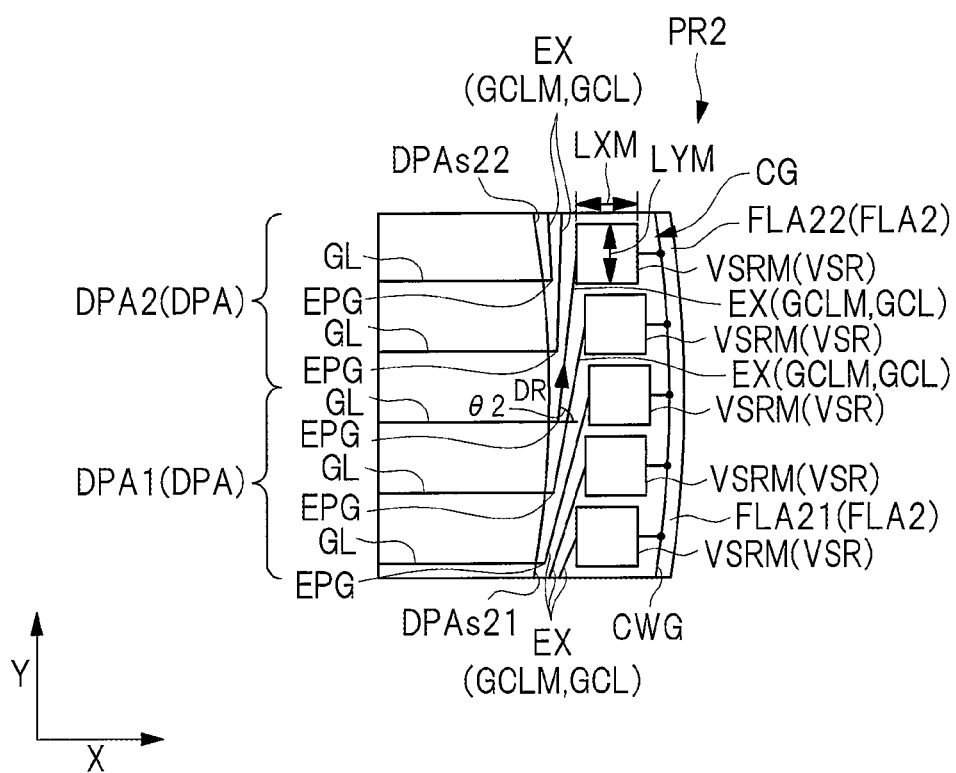
FIG. 17 is a plan view illustrating a layout of a transfer circuit in a frame region in a display apparatus according to a modified example of the first embodiment.
Figure 18:
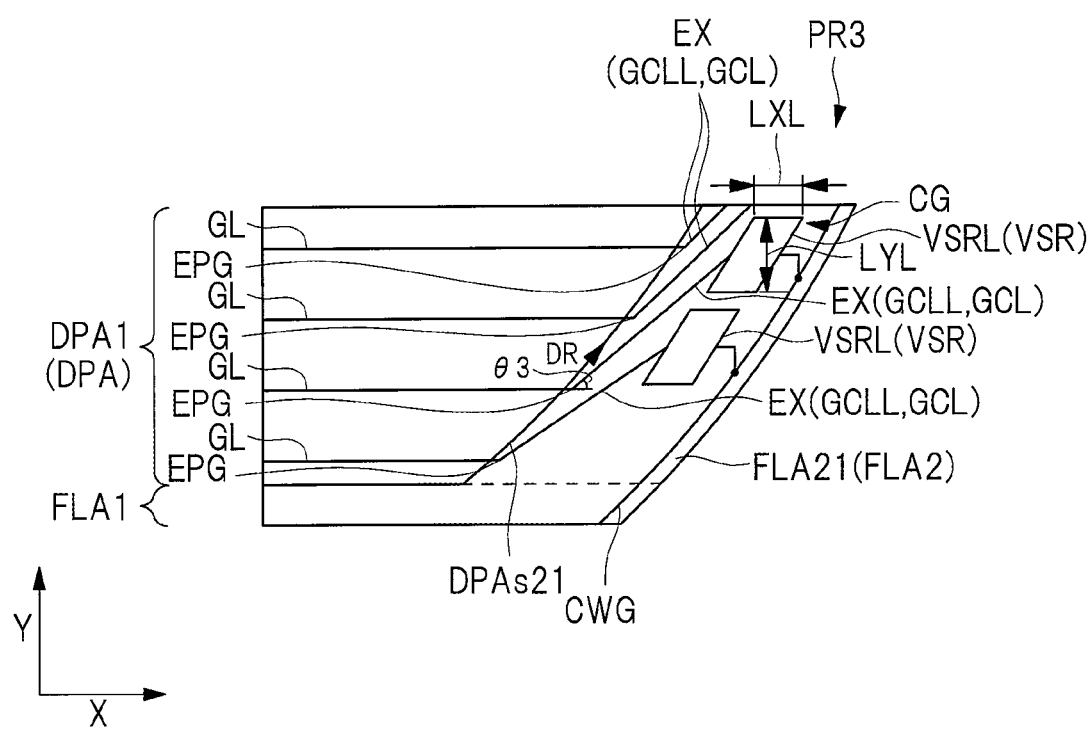
FIG. 18 is a plan view illustrating a layout of a transfer circuit in a frame region in a display apparatus according to a modified example of the first embodiment.

FIGS. 16 to 18 are plan views each illustrating the layout of transfer circuits in a frame region in a display apparatus according to a modification example of the first embodiment. FIG. 16 illustrates the layout of the transfer circuits VSR in the portion PR1 surrounded by the dashed-two dotted line in FIG. 1 so as to be enlarged. FIG. 17 illustrates the layout of the transfer circuits in the portion PR2 surrounded by the dashed-two dotted line in FIG. 1 so as to be enlarged. FIG. 18 illustrates the layout of the transfer circuits VSR in the portion PR3 surrounded by the dashed-two dotted line in FIG. 1 so as to be enlarged.

Also in the present modification example, as similar to the first embodiment, assume that transfer circuits VSR provided in a portion on the positive side in the Y-axis direction in the region FLA22 are transfer circuits VSRU as illustrated in FIG. 16 which illustrates the layout of the transfer circuits VSR in the portion PR1 in FIG. 1. Furthermore, assume that transfer circuits VSR provided in a portion on the negative side in the Y-axis direction in the region FLA22 and a portion on the positive side in the Y-axis direction in the region FLA21 are transfer circuits VSRM as illustrated in FIG. 17 which illustrates the layout of the transfer circuits VSR in the portion PR2 in FIG. 1. Furthermore, assume that transfer circuits VSR provided in a portion on the negative side in the Y-axis direction in the region FLA21 are transfer circuits VSRL as illustrated in FIG. 18 which illustrates the layout of the transfer circuits VSR in the portion PR3 in FIG. 1.

Also in the present modification example, as similar to the first embodiment, the length LXM of the transfer circuit VSRM in the X-axis direction can be made shorter than the length LXU of the transfer circuit VSRU in the X-axis direction, and the length LXL of the transfer circuit VSRL in the X-axis direction can be made shorter than the length LXM of the transfer circuit VSRM in the X-axis direction. The length LYM of the transfer circuit VSRM in the Y-axis direction can be made longer than the length LYU of the transfer circuit VSRU in the Y-axis direction, and the length LYL of the transfer circuit VSRL in the Y-axis direction can be made longer than the length LYM of the transfer circuit VSRM in the Y-axis direction.

Furthermore, an aspect ratio of the length LYM of the transfer circuit VSRM in the Y-axis direction with respect to the length LXM of the transfer circuit VSRM in the X-axis direction can be made larger than an aspect ratio of the length LYU of the transfer circuit VSRU in the Y-axis direction with respect to the length LXU of the transfer circuit VSRU in the X-axis direction. Furthermore, an aspect ratio of the length LYL of the transfer circuit VSRL in the Y-axis direction with respect to the length LXL of the transfer circuit VSRL in the X-axis direction can be made larger than an aspect ratio of the length LYM of the transfer circuit VSRM in the Y-axis direction with respect to the length LXM of the transfer circuit VSRM in the X-axis direction.

Meanwhile, in the present modification example, as different from the first embodiment, the respective shapes of the plurality of transfer circuits VSRU in the portion PR1 are the same as each other. That is, in the portion PR1, the respective shapes of two adjacent transfer circuits VSRU are the same as each other. Furthermore, in the portion PR2, the respective shapes of the plurality of transfer circuits VSRM are the same as each other. That is, in the portion PR2, the respective shapes of two adjacent transfer circuits VSRM are the same as each other. Furthermore, in the portion PR3, the respective shapes of the plurality of transfer circuits VSRL are the same as each other. That is, in the portion PR3, the respective shapes of two adjacent transfer circuits VSRL are the same as each other.

In other words, in the present modification example, the frame region FLA2 is divided into a plurality of portions, a plurality of transfer circuits VSR are provided in each of the plurality of divided portions PR1, PR2, and PR3, and the respective shapes of the plurality of transfer circuits VSR in the same portion are the same as each other.

In such a case, the number of shape types of the plurality of transfer circuits VSR provided in the frame region FLA2 can be reduced, and the layout of transistors included in the transfer circuits VSR or wirings can be easily designed. Therefore, the manufacturing process of the display apparatus can be shortened.

Second Embodiment

In the first embodiment, the transfer circuits VSR are provided in the frame region FLA2. On the other hand, in the second embodiment, the transfer circuits VSR are also provided in the frame region FLA3 in addition to the frame region FLA2.

Also in the second embodiment, the configuration of a display apparatus, an equivalent circuit of the display apparatus, and the configuration of a scanning line driving circuit CG can be similar to those in the first embodiment, and description thereof is omitted.

<Layout of Transfer Circuits>

Figure 19:
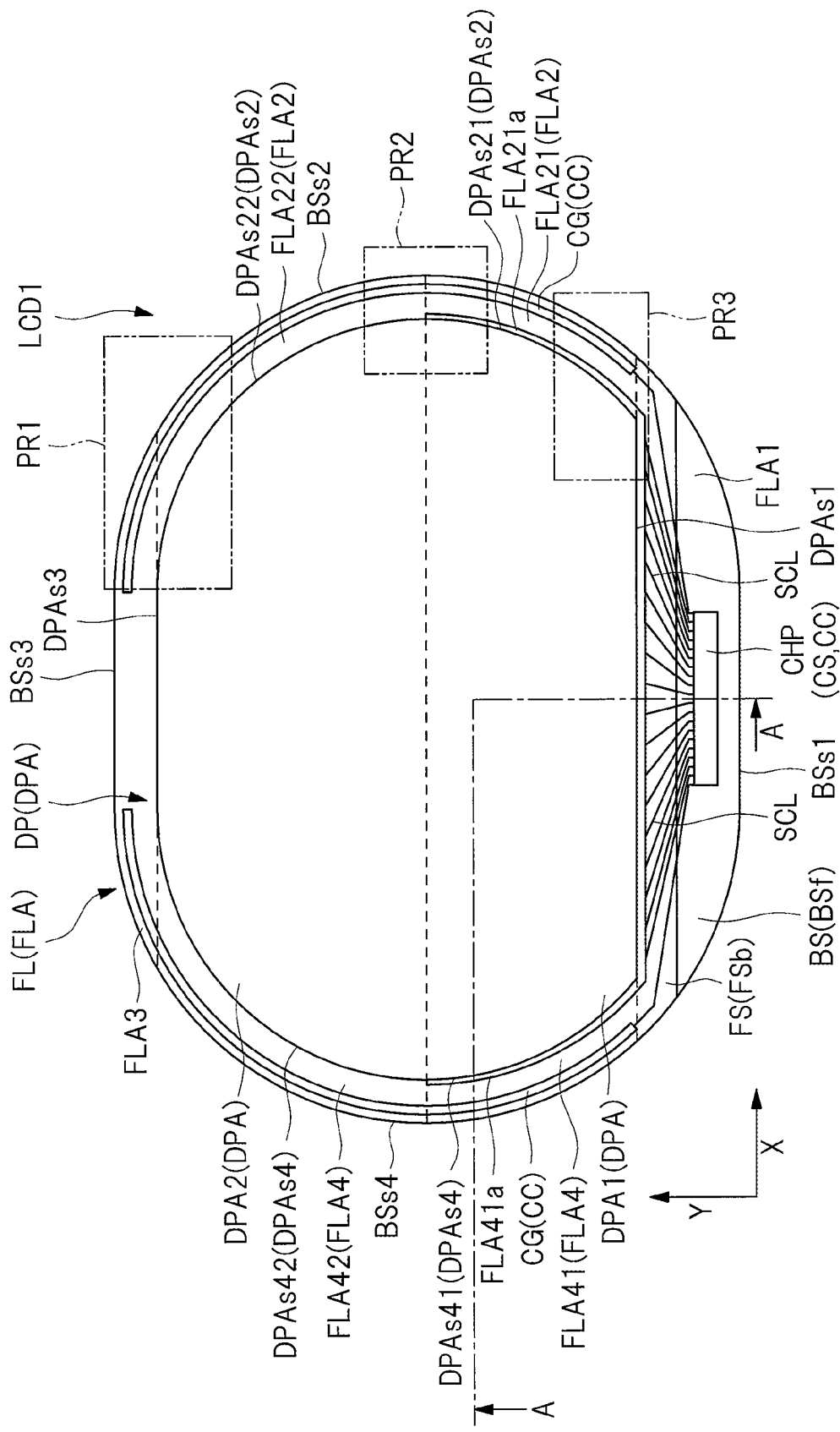
FIG. 19 is a plan view illustrating an example of a display apparatus according to a second embodiment.
Figure 20:
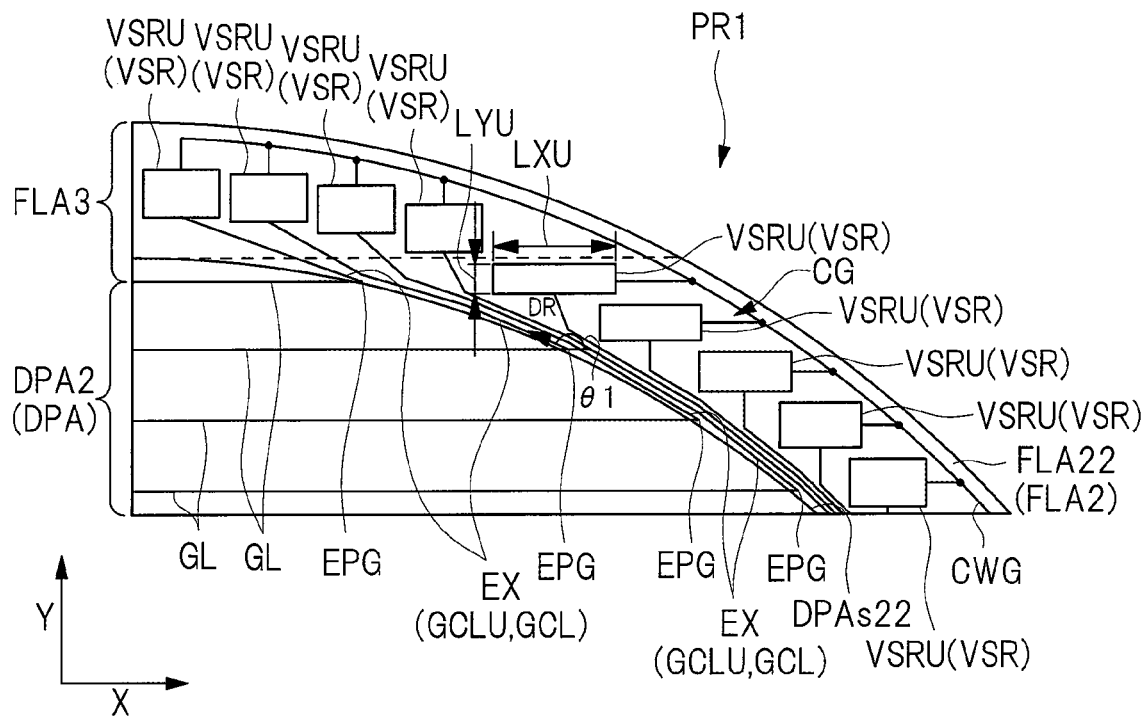
FIG. 20 is a plan view illustrating a layout of a transfer circuit in a frame region in a display apparatus according to the second embodiment.
Figure 21:
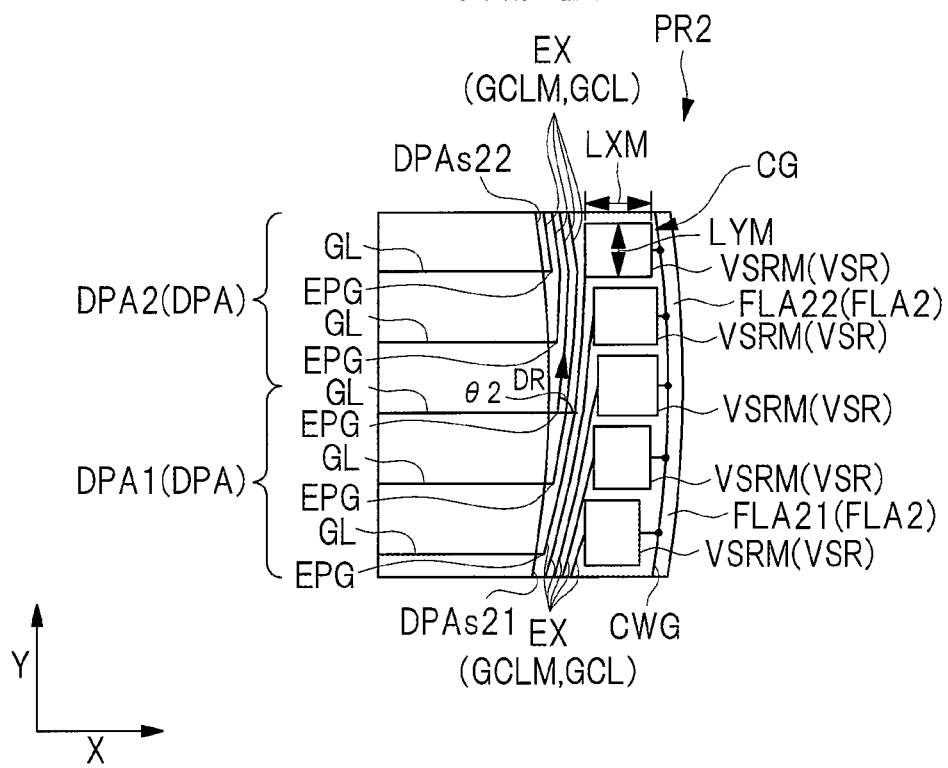
FIG. 21 is a plan view illustrating a layout of a transfer circuit in a frame region in a display apparatus according to the second embodiment.
Figure 22:
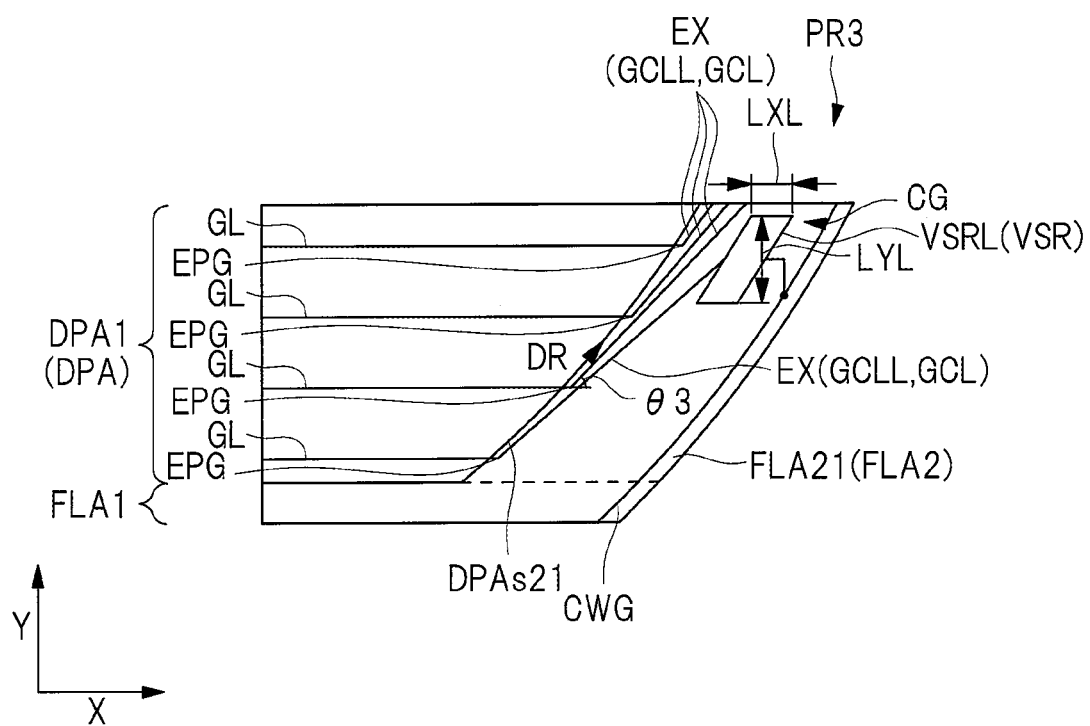
FIG. 22 is a plan view illustrating a layout of a transfer circuit in a frame region in a display apparatus according to the second embodiment.

Next, with reference to FIGS. 19 to 22, the layout of transfer circuits VSR will be described. FIG. 19 is a plan view illustrating an example of the display apparatus according to the second embodiment. FIGS. 20 to 22 are plan views each illustrating the layout of transfer circuits in a frame region in the display apparatus according to the second embodiment. FIG. 20 illustrates the layout of the transfer circuits VSR in the portion PR1 surrounded by the dashed-two dotted line in FIG. 19 so as to be enlarged. FIG. 21 illustrates the layout of the transfer circuits VSR in the portion PR2 surrounded by the dashed-two dotted line in FIG. 19 so as to be enlarged. FIG. 22 illustrates the layout of the transfer circuits VSR in the portion PR3 surrounded by the dashed-two dotted line in FIG. 19 so as to be enlarged.

Regarding the layout of transfer circuits, differences from the first embodiment will be mainly described below.

Also in the second embodiment, as similar to the first embodiment, assume that transfer circuits VSR provided in a portion on the positive side in the Y-axis direction in the region FLA22 are transfer circuits VSRU as illustrated in FIG. 20 which illustrates the layout of the transfer circuits in the portion PR1 in FIG. 19. Furthermore, assume that transfer circuits VSR provided in a portion on the negative side in the Y-axis direction in the region FLA22 and a portion on the positive side in the Y-axis direction in the region FLA21 are transfer circuits VSRM as illustrated in FIG. 21 which illustrates the layout of the transfer circuits in the portion PR2 in FIG. 19. Furthermore, assume that transfer circuits VSR provided in a portion on the negative side in the Y-axis direction in the region FLA21 are transfer circuits VSRL as illustrated in FIG. 22 which illustrates the layout of the transfer circuits in the portion PR3 in FIG. 19.

Also in the present second embodiment, as similar to the first embodiment, for example, the length LXM of the transfer circuit VSRM in the X-axis direction can be made shorter than the length LXU of the transfer circuit VSRU in the X-axis direction, and the length LXL of the transfer circuit VSRL in the X-axis direction can be made shorter than the length LXM of the transfer circuit VSRM in the X-axis direction. The length LYM of the transfer circuit VSRM in the Y-axis direction can be made longer than the length LYU of the transfer circuit VSRU in the Y-axis direction, and the length LYL of the transfer circuit VSRL in the Y-axis direction can be made longer than the length LYM of the transfer circuit VSRM in the Y-axis direction.

Furthermore, an aspect ratio of the length LYM of the transfer circuit VSRM in the Y-axis direction with respect to the length LXM of the transfer circuit VSRM in the X-axis direction can be made larger than an aspect ratio of the length LYU of the transfer circuit VSRU in the Y-axis direction with respect to the length LXU of the transfer circuit VSRU in the X-axis direction. Furthermore, an aspect ratio of the length LYL of the transfer circuit VSRL in the Y-axis direction with respect to the length LXL of the transfer circuit VSRL in the X-axis direction can be made larger than an aspect ratio of the length LYM of the transfer circuit VSRM in the Y-axis direction with respect to the length LXM of the transfer circuit VSRM in the X-axis direction.

On the other hand, in the present second embodiment, as different from the first embodiment, a part of the scanning line driving circuit CG is provided in the frame region FLA3 as illustrated in FIG. 19, and one or more of the plurality of transfer circuits VSR of the plurality of transfer circuits VSR are provided in the frame region FLA3 as illustrated in FIG. 20. That is, in the plurality of transfer circuits VSR, at least a transfer circuit VSR connected to a scanning line GL arranged at a positive-side end of the layout of the plurality of scanning lines GL in the Y-axis direction is provided in the frame region FLA3.

This manner allows each of the plurality of transfer circuits VSR to be arranged closer to the positive side in the Y-axis direction than a case in which all of the plurality of transfer circuits VSR are provided in the frame region FLA2. Therefore, it is possible to shorten the X-axis direction length LXL of a side of a transfer circuit VSRL on the positive side or the negative side in the Y-axis direction, the transfer circuit VSRL being arranged in a portion on the negative side in the Y-axis direction in the region FLA21 arranged along the side portion DPAs21. Therefore, it is possible to narrow the width of a portion on the negative side in the Y-axis direction in the region FLA21 arranged along the side portion DPAs21.

In the present second embodiment, as different from the first embodiment, note that the directions DR of the extensions EX of at least two connection wirings GCL extend are different from each other.

Specifically, an angle $\theta2$ formed between the X-axis direction and a direction DR in which the extensions EX included in the connection wirings GCLM extend can be made smaller than an angle $\theta1$ formed between the X-axis direction and a direction DR in which the extensions EX included in the connection wirings GCLU extend. Furthermore, an angle $\theta3$ formed between the X-axis direction and a direction DR in which the extensions EX included in the connection wirings GCLL extend can be made smaller than the angle $\theta2$ formed between the X-axis direction and the direction DR in which the extensions EX included in the connection wirings GCLM extend. In this manner, it is possible to increase the angle $\theta1$ formed between the X-axis direction and the direction DR in which the extensions EX included in the connection wirings GCLU extend, so that one transfer circuit VSR of the plurality of transfer circuits VSR can be easily arranged in the frame region FLA3.

On the other hand, in the present second embodiment, as similar to the first embodiment, the shapes of two transfer circuits VSR may be the same as each other or different from each other. Accordingly, as illustrated in FIG. 20, the shape of a transfer circuit VSRU arranged in the frame region FLA3 in the transfer circuits VSRU provided in the portion PR1 may be different from the shape of a transfer circuit VSRU arranged in a portion on the positive side in the Y-axis direction in the region FLA22.

In the foregoing, the invention made by the present inventors has been concretely described based on the embodiments. However, it is needless to say that the present invention is not limited to the foregoing embodiments and various modifications and alterations can be made within the scope of the present invention. The configuration of the frame region FLA2 has been described above. However, the invention is applicable also to the frame region FLA4.

For example, in the above-described embodiments, the case of the display apparatus without the touch panel has been exemplified as a disclosure example. However, the invention is also applicable to a display apparatus with a touch panel as another application example. In the above-described embodiments, the common electrode is commonly formed in the display region. However, the common electrode can be divided into a plurality of common electrodes in the Y-axis direction to each of which a driving signal for a touch panel is supplied. In this case, for each of the divided common electrodes, it is required to provide a connection wiring CWC that supplies a drive signal for the touch panel from a common electrode driving circuit CM to the common electrode. Accordingly, the number of connection wirings CWC is large on the negative side of the frame region FLA2 in the Y-axis direction (on the region FLA21 side serving as a frame region) while the number of connection wirings CWC is small on the positive side thereof in the Y-axis direction (on the region FLA22 side serving as a frame region) in some cases. Even in such a case, transfer circuits that drive scanning lines can be configured as similar to the present invention. However, while the RGB switches are not provided in the region FLA22 serving as a frame region in some cases, the connection wirings CWC are provided also in the region FLA22 serving as a frame region. Even in such a case, the idea of the region FLA21 serving as a frame region of the present invention is applicable to the region FLA22 serving as a frame region. When the common electrode is divided for driving of the touch panel as described above, note that each common electrode is driven by a shift register provided in the frame region FLA2 in some cases. In this case, the configuration of the transfer circuits of the present invention is applicable to transfer circuits included in the shift register that drives the common electrodes. In this case, the invention of the present application is also applicable to both of the transfer circuits that drive the scanning lines and the transfer circuits that drive the common electrodes. However, the present invention is applicable only to the transfer circuits that drive the common electrodes, or only to some of the transfer circuits. Even in the configuration in which the common electrode is divided into the plurality of common electrodes in the X-axis direction to each of which a drive signal for a touch panel is supplied, note that the invention of the present application is applicable since it may be required to provide connection wirings CWC and transfer circuits in the region FLA21 serving as a frame region. Note that the transfer circuit is also called a stage of a shift register, a stage circuit, an output circuit, a basic circuit, or others in some cases. One transfer circuit is a circuit that supplies a scanning signal to a single scanning line, and the transfer circuits are formed by almost the same circuit. The shape of a transfer circuit refers to the actual layout of elements such as transistors, diodes, and capacitors included in the transfer circuits and the wirings that connect these elements or others. Even when some elements, wirings, and others are mixed between adjacent transfer circuits, the layout of one transfer circuit is specified based on the circuit. Further, since the lengths of the scanning lines are different from each other in a variant display as described above, a difference is made in the size of an output transistor of a transfer circuit depending on the length of a scanning line in some cases. In such a case, the area of the transfer circuit is different in some cases or the layout itself is different in some cases depending on the degree of the difference in the size.

In the above-described embodiments, the case of the liquid crystal display apparatus has been exemplified as the disclosure example. However, as another application example, many types of flat-panel display apparatuses such as an organic EL display apparatus, other self-luminous type display apparatus, and an electronic-paper type display apparatus having an electrophoretic element or others can be exemplified. And, it is needless to say that the present invention is applicable to display apparatuses ranging from small- or middle-sized one to large one without any particular limitation. Note that the substrate is not limited to be made of glass, but a flexible substrate made of a resin or others may be used. Furthermore, the shape of the display region is not limited to the deformed ellipse as seen in the present invention, and may be any of various shapes such as a circle, a semi-circle, a semi-ellipse, a triangle, a trapezoid, a polygon other than a rectangle, and a heart-shape. By the configuration of the invention of the present application, it is possible to achieve a display apparatus in which the area of a frame region can be reduced and in which a shape of a display region and a shape of a peripheral portion of a substrate are the same as each other, i.e., a distance from an outermost portion of the display region to the peripheral portion of the substrate (the width of the frame region) is uniform.

Various modification examples and alteration examples can be thought up by those who skilled in art in the scope of the concept of the present invention, and it will be understood that these modification examples and alteration examples also belong to the scope of the present invention.

For example, the appropriate addition of the component to, elimination of the component from, or design change of the component from each embodiment described above by those who skilled in art, or addition of the process, omitting of the process, or condition change are also included in the scope of the present invention as long as the gist of the present invention is provided.

The present invention is effectively applied to a display apparatus.

What is claimed is:

1. A display device comprising:
    a display area;
    a peripheral area around the display area;
    a first scanning line and a second scanning line extending to a first direction and provided on the display area;
    a first shift register provided on the peripheral area and electrically connected to the first scanning line;
    a second shift register provided on the peripheral area and electrically connected to the second scanning line;
    a third shift register provided on the peripheral area and electrically connected to the first scanning line;
    a fourth shift register provided on the peripheral area and electrically connected to the second scanning line;
    a first connection wiring provided on the peripheral area and connecting the first scanning line and the first shift register;
    a second connection wiring provided on the peripheral area and connecting the second scanning line and the second shift register;
    a third connection wiring provided on the peripheral area and connecting the first scanning line and the third shift register;
    a fourth connection wiring provided on the peripheral area and connecting the second scanning line and the fourth shift register; and
    a semiconductor chip mounted on the peripheral area,
    wherein the display area is located between the first shift register and the third shift register and between the second shift register and the fourth shift register,
    the first scanning line is supplied with a signal from the first shift register and the third shift register,
    the second scanning line is supplied with a signal from the second shift register and the fourth shift register,
    the second scanning line is closer to the semiconductor chip than the first scanning line,
    the first scanning line is shorter than the second scanning line, in a plan view,
    an interval in the first direction between the first shift register and the third shift register is shorter than an interval in the first direction between the second shift register and the fourth shift register, in a plan view, and the second connection wiring is longer than the first connection wiring, in a plan view.

2. The display device according to claim 1,
wherein the second connection wiring extends to a second direction crossing the first direction, and
the first connection wiring extends to a third direction crossing the first direction and the second direction.

3. The display device according to claim 1,
wherein the second connection wiring extends to a second direction crossing the first direction, and
the first connection wiring extends to a third direction crossing the first direction and the second direction.

4. The display device according to claim 3,
wherein the fourth connection wiring extends to the second direction, and
the third connection wiring extends to a fourth direction crossing the first direction, the second direction and the third direction.

5. The display device according to claim 1,
wherein the display area includes a round external form near the first shift register and the second shift register.

6. The display device according to claim 1,
wherein the first scanning line is closer to the semiconductor chip than the first shift register and the second shift register.

7. The display device according to claim 1,
wherein the first shift register and the first scanning line are not arranged in the first direction, and
the second shift register and the second scanning line are not arranged in the first direction.

8. The display device according to claim 1,
wherein the first scanning line and the second scanning line are arranged in a direction orthogonal to the first direction.

* * * * *